United States Patent
Watanabe

(10) Patent No.: US 12,454,460 B2
(45) Date of Patent: *Oct. 28, 2025

(54) SPHERICAL SILICA PARTICLES, SLURRY COMPOSITION, RESIN COMPOSITION, AND METHOD FOR PRODUCING SPHERICAL SILICA PARTICLES

(71) Applicant: ADMATECHS CO., LTD., Miyoshi (JP)

(72) Inventor: Yusuke Watanabe, Miyoshi (JP)

(73) Assignee: ADMATECHS CO., LTD., Miyoshi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/065,235

(22) Filed: Feb. 27, 2025

(65) Prior Publication Data

US 2025/0197227 A1 Jun. 19, 2025

Related U.S. Application Data

(63) Continuation of application No. PCT/JP2022/032670, filed on Aug. 30, 2022.

(51) Int. Cl.
| | | |
|---|---|---|
| C08K 7/18 | (2006.01) | |
| C01B 33/18 | (2006.01) | |
| C09C 1/30 | (2006.01) | |

(52) U.S. Cl.
CPC ............... C01B 33/18 (2013.01); C08K 7/18 (2013.01); C09C 1/3063 (2013.01); C01P 2004/03 (2013.01); C01P 2004/04 (2013.01); C01P 2004/32 (2013.01); C01P 2004/61 (2013.01); C01P 2004/62 (2013.01); C01P 2006/10 (2013.01); C01P 2006/14 (2013.01); C01P 2006/80 (2013.01); C08K 2201/005 (2013.01)

(58) Field of Classification Search
CPC ...... C08K 7/18; C08K 3/36; C08K 2201/005; C01P 2004/04; C01P 2004/32; C01P 2004/61; C01P 2004/62; C01P 2006/10; C01P 2006/14; C01P 2006/80
USPC ......................................... 524/493
See application file for complete search history.

(56) References Cited

U.S. PATENT DOCUMENTS

| | | | |
|---|---|---|---|
| 9,272,915 B2 | 3/2016 | Doshita | |
| 9,656,874 B2 | 5/2017 | Doshita | |
| 11,608,273 B2 | 3/2023 | Kamiya et al. | |
| 12,134,563 B2 | 11/2024 | Egami | |
| 12,157,673 B2 | 12/2024 | Kamiya et al. | |
| 2013/0288055 A1 | 10/2013 | Doshita | |
| 2013/0289133 A1 | 10/2013 | Doshita | |
| 2017/0135920 A1* | 5/2017 | Enomoto | A61K 8/19 |
| 2020/0283300 A1 | 9/2020 | Kamiya et al. | |
| 2021/0094835 A1 | 4/2021 | Egami | |
| 2023/0138940 A1 | 5/2023 | Kamiya et al. | |
| 2023/0312355 A1 | 10/2023 | Miyoshi | |
| 2025/0197226 A1* | 6/2025 | Watanabe | C01B 33/187 |

FOREIGN PATENT DOCUMENTS

| | | |
|---|---|---|
| CN | 1800012 A | 7/2006 |
| JP | 2006027985 A | 2/2006 |
| JP | 2007153671 A | 6/2007 |
| JP | 2010138021 A | 6/2010 |
| JP | 2010260755 A | 11/2010 |
| JP | 2012140286 A | 7/2012 |
| JP | 2014055082 A | 3/2014 |
| JP | 2020083736 A | 6/2020 |
| JP | 2021054685 A | 4/2021 |
| JP | 7008004 B2 | 2/2022 |
| WO | WO-2012096172 A1 | 7/2012 |
| WO | WO-2019131873 A1 | 4/2020 |
| WO | WO-2019131658 A1 | 12/2020 |
| WO | WO-2022014130 A1 | 1/2022 |

OTHER PUBLICATIONS

International Search Report issued Oct. 25, 2022 in PCT/JP2022/032670 (with English translation), 5 pages.
Written Opinion issued Oct. 25, 2022 in PCT/JP2022/032670 (with English translation), 6 pages.

* cited by examiner

*Primary Examiner* — Hannah J Pak
(74) *Attorney, Agent, or Firm* — Element IP, PLC

(57) ABSTRACT

An object is to provide a novel method for producing spherical silica particles having fine voids. That is, spherical silica particles according to the present disclosure contain silica as a main component, have an average particle diameter of 0.1 to 10.0 μm, a true specific gravity of 0.9 to 1.9 g/cm$^3$, the true specific gravity being measured with nitrogen gas, a pore volume of 0.1 mL/g or lower, an Na content of 10 ppm or lower, and a true specific gravity retention rate of 80% or higher, the true specific gravity retention rate being measured with nitrogen gas and being a rate between before and after pressurization is performed at 300 MPa for 1 minute, and include, in an existence proportion of 60% or lower, particles in each of which a maximum value among major axes of internal voids is not smaller than half a major axis of the particle.

12 Claims, 18 Drawing Sheets

Sample 3

Sample 4

Sample 5

Sample 6

Sample 7

Sample 9

Sample 11

Sample 13

Sample 16

Sample 17

Sample 18

Sample 19

Sample 17

Sample 11

Sample 17

Sample 22

Sample 23

SPHERICAL SILICA PARTICLES, SLURRY COMPOSITION, RESIN COMPOSITION, AND METHOD FOR PRODUCING SPHERICAL SILICA PARTICLES

CROSS REFERENCE TO RELATED APPLICATIONS

The present application is a Continuation Application of International Application No. PCT/JP2022/032670, filed Aug. 30, 2022, which is incorporated herein by reference.

TECHNICAL FIELD

The present disclosure relates to spherical silica particles and a method for producing the same and specifically relates to hollow spherical silica particles having voids therein and a method for producing the same.

BACKGROUND ART

Wet template methods have been known as methods for producing hollow silica. As the wet template methods, there are: methods that each include performing silica coating with use of inorganic particles other than silica as a template and dissolving, or heating and decomposing, the inside (Patent Literatures 1 and 2); and methods that each include synthesizing silica in a solution in which a hydrophobic organic solvent has been emulsified in a hydrophilic solvent (Patent Literatures 3 and 4).

In addition, as a method for producing hollow silica, there is a method that includes melting porous silica to produce hollow silica (Patent Literature 5).

Furthermore, methods that each include performing spray drying or spray pyrolysis to produce hollow silica have also been known (Patent Literatures 6 and 7).

CITATION LIST

Patent Literature

Patent Literature 1: JP2012-140286 (A)
Patent Literature 2: WO2022/014130
Patent Literature 3: JP2014-55082 (A)
Patent Literature 4: WO2019/131658
Patent Literature 5: JP2010-260755 (A)
Patent Literature 6: JP7008004 (B)
Patent Literature 7: JP2020-83736 (A)

SUMMARY OF INVENTION

Technical Problem

However, the methods disclosed in Patent Literatures 1 to 4 have the following problem. That is, a structure in which particles have large voids therein is obtained so that increase in the degree of hollowness easily leads to decrease in the strengths of the particles, and, when the particles are used as a filler for an electronic material, the large internal voids are exposed at the time of via processing, whereby a problem arises in terms of plating reliability or the like.

In addition, in the method disclosed in Patent Literature 5, an operation for melting porous silica is performed, whereby particles having particle diameters of 3 μm or smaller are difficult to obtain. Likewise, in the methods that are disclosed in Patent Literatures 6 and 7 and that each include spray drying or the like, particles having diameters of 5 μm or smaller are difficult to produce with the above feature as well.

The present disclosure has been made in view of the above circumstances, and an object of the present disclosure is to provide novel spherical silica particles and a method for producing the same.

Solution to Problem

The present inventors conducted thorough studies in order to achieve the above object. As a result, the present inventors have found that spherical silica particles having fine voids therein are produced by using an alkaline aqueous solution of silicic acid (hereinafter, "alkaline silicic acid aqueous solution") as a raw material. The present inventors have completed the following invention on the basis of this finding.

That is, spherical silica particles according to the present disclosure contain silica as a main component. The spherical silica particles have an average particle diameter of 0.1 to 10.0 μm, a true specific gravity of 0.9 to 1.9 g/cm$^3$, the true specific gravity being measured with nitrogen gas, a pore volume of 0.1 mL/g or lower, an Na content of 10 ppm or lower, and a true specific gravity retention rate of 80% or higher, the true specific gravity retention rate being measured with nitrogen gas and being a rate between before and after pressurization is performed at 300 MPa for 1 minute. The spherical silica particles include, in an existence proportion of 60% or lower, particles in each of which a maximum value among major axes of internal voids is not smaller than half a major axis of the particle.

In addition, a method for producing spherical silica particles according to the present disclosure for achieving the above object includes:
  a raw material silica particle preparation step of preparing
    a liquid dispersion of raw material silica particles from
    a raw material solution obtained by dissolving silicic
    acid in a mixed solvent of water and an organic solvent
    in the presence of a basic substance formed from at
    least one of a quaternary ammonium and a base having
    a cyclic amidine structure;
  a hydrothermal treatment step of substituting, with water,
    a dispersion medium which is contained in the liquid
    dispersion and in which the raw material silica particles
    are dispersed, and then performing pressurization and
    heating to 130° C. or higher and 250° C. or lower,
    thereby obtaining a hydrothermally treated liquid dispersion of the raw material silica particles; and
  a heating step of heating the liquid dispersion or the raw
    material silica particles obtained from the liquid dispersion through solid-liquid separation so as to remove
    an organic substance contained in the liquid dispersion,
    thereby preparing spherical silica particles, the heating
    step being subsequent to the hydrothermal treatment
    step.

The mixed solvent has a relative permittivity of 21 or higher and 40 or lower.

A quaternary ammonium derived from the basic substance is blended in a blending ratio of 0.3 or higher and 0.8 or lower in terms of molar ratio with respect to a silicon element derived from the silicic acid.

Advantageous Effects of Invention

The spherical silica particles according to the present disclosure are particles having finer voids than conventional spherical silica particles having voids therein. The conventional spherical silica particles having large voids therein have outer shells that are easily fractured by external force. Meanwhile, the spherical silica particles according to the present disclosure have finer voids than the conventional spherical silica particles, and thus are hardly fractured even upon receiving the same external force.

DESCRIPTION OF EMBODIMENTS

Figure 1:
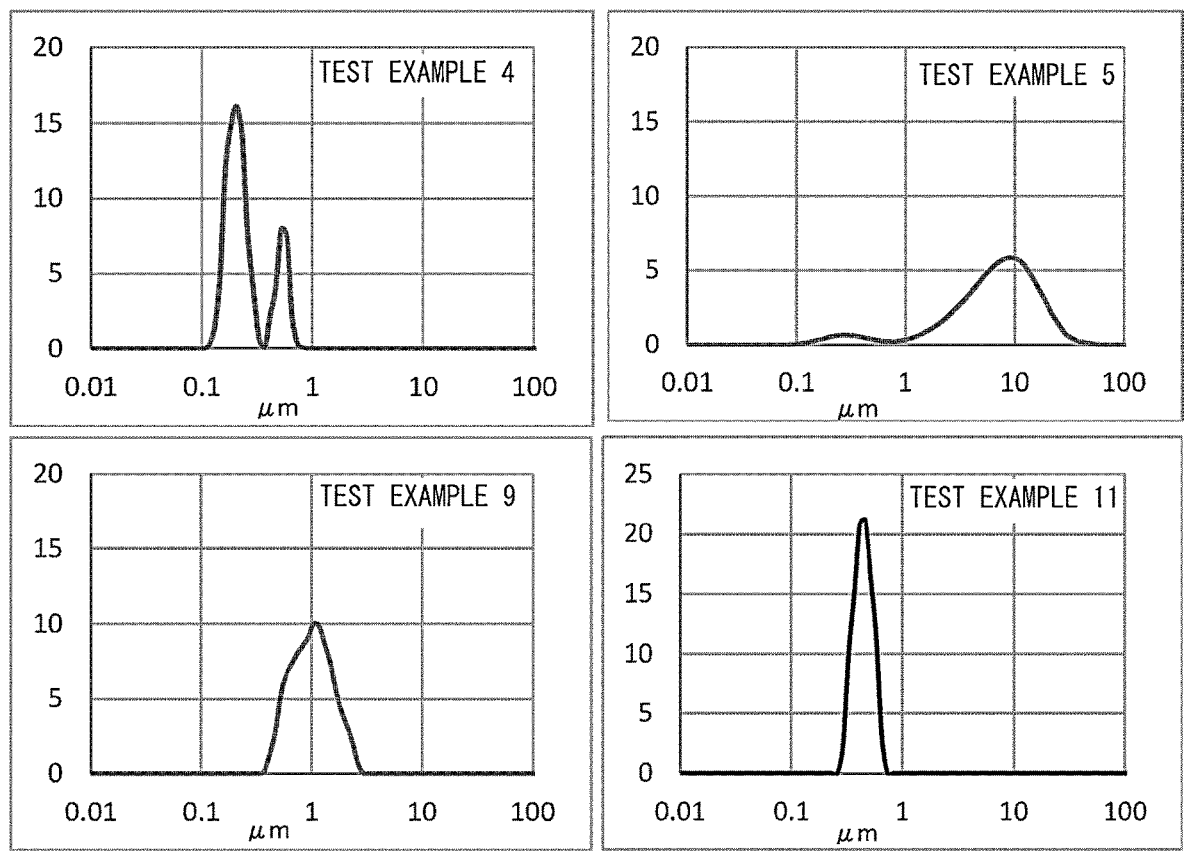
FIG. 1 shows histograms indicating particle size distributions of test samples in Test Examples 4, 5, 9, and 11 among Examples.
Figure 2:
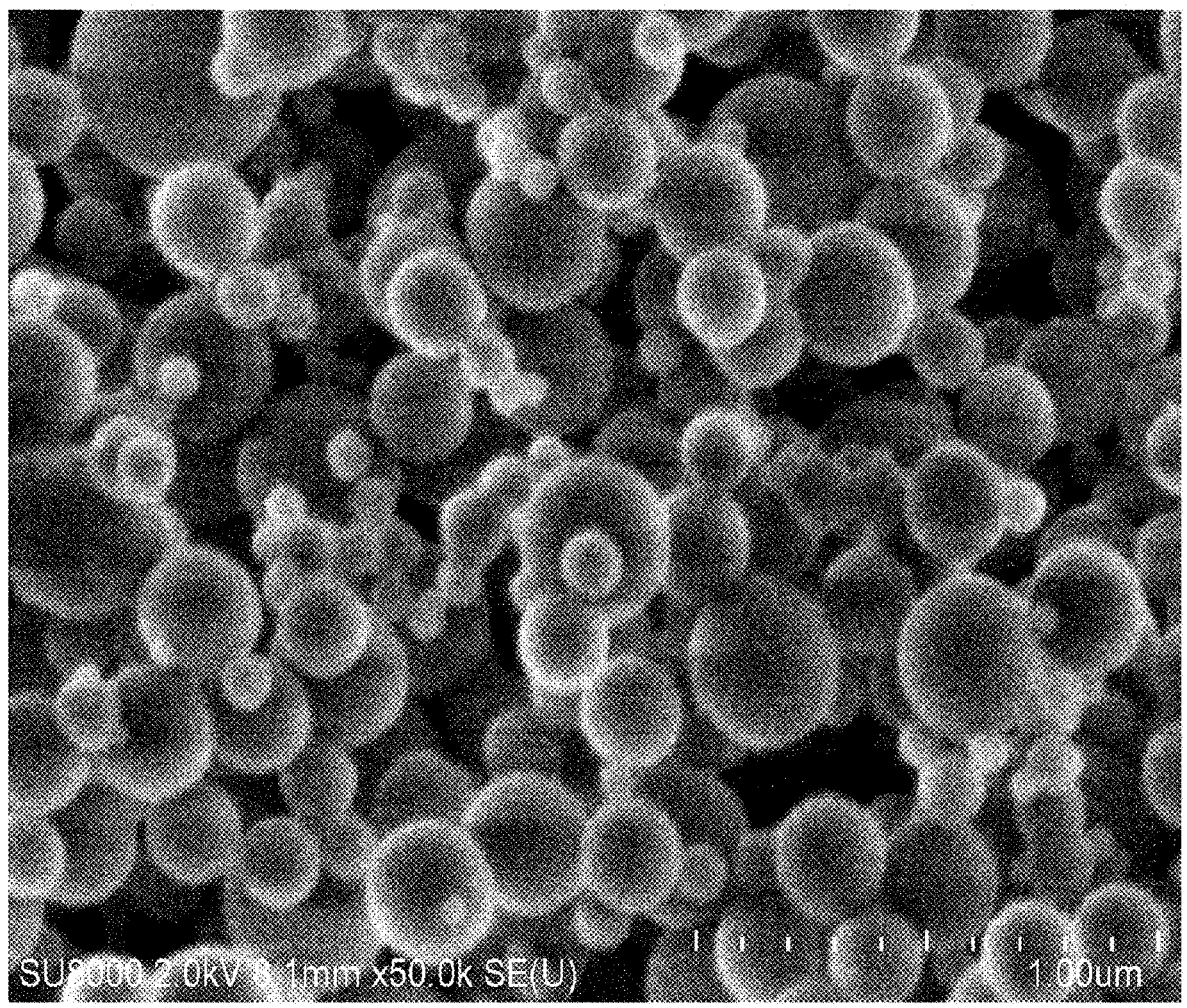
FIG. 2 is an SEM photograph of a test sample in Test Example 3 among the Examples.
Figure 3:
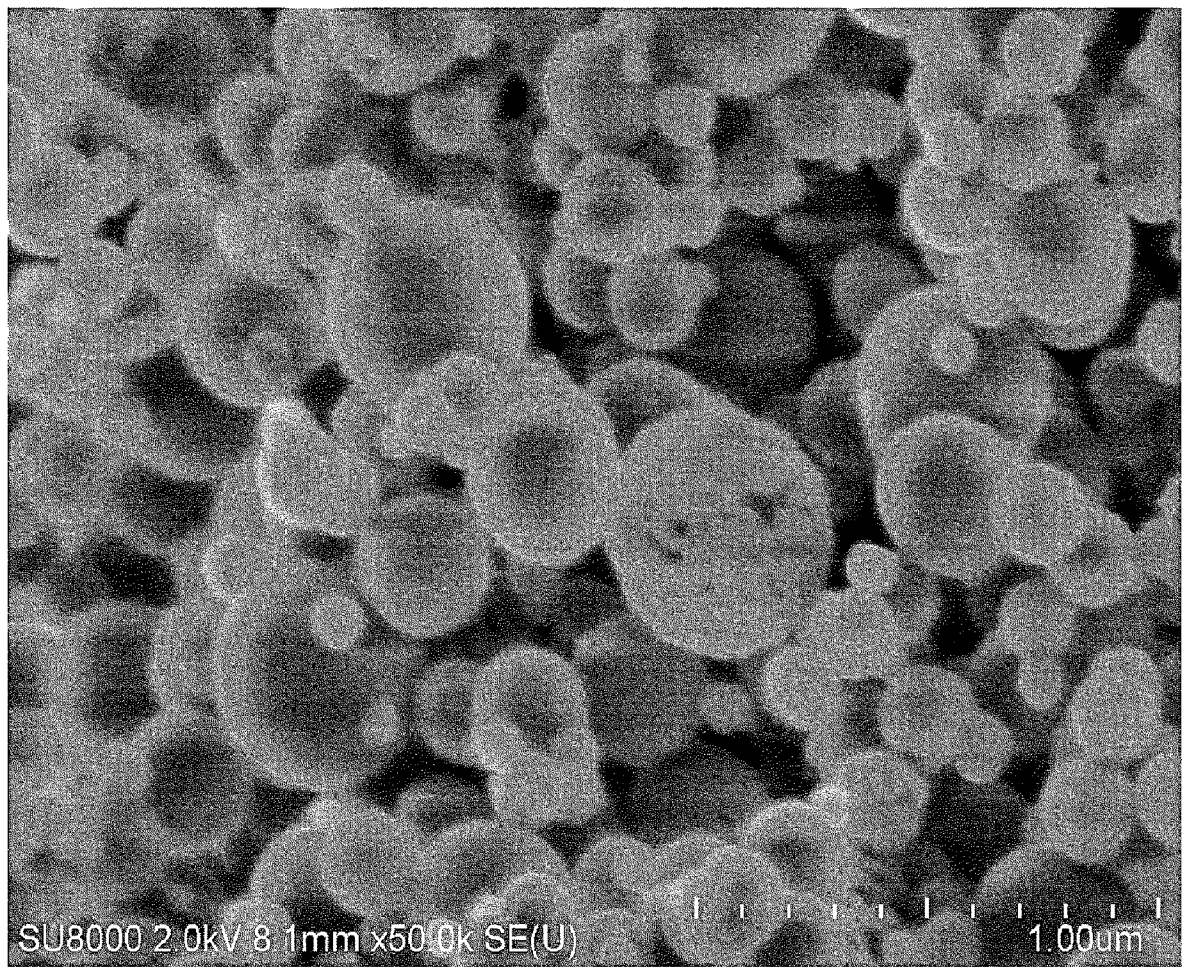
FIG. 3 is an SEM photograph of the test sample in Test Example 4 among the Examples.
Figure 4:
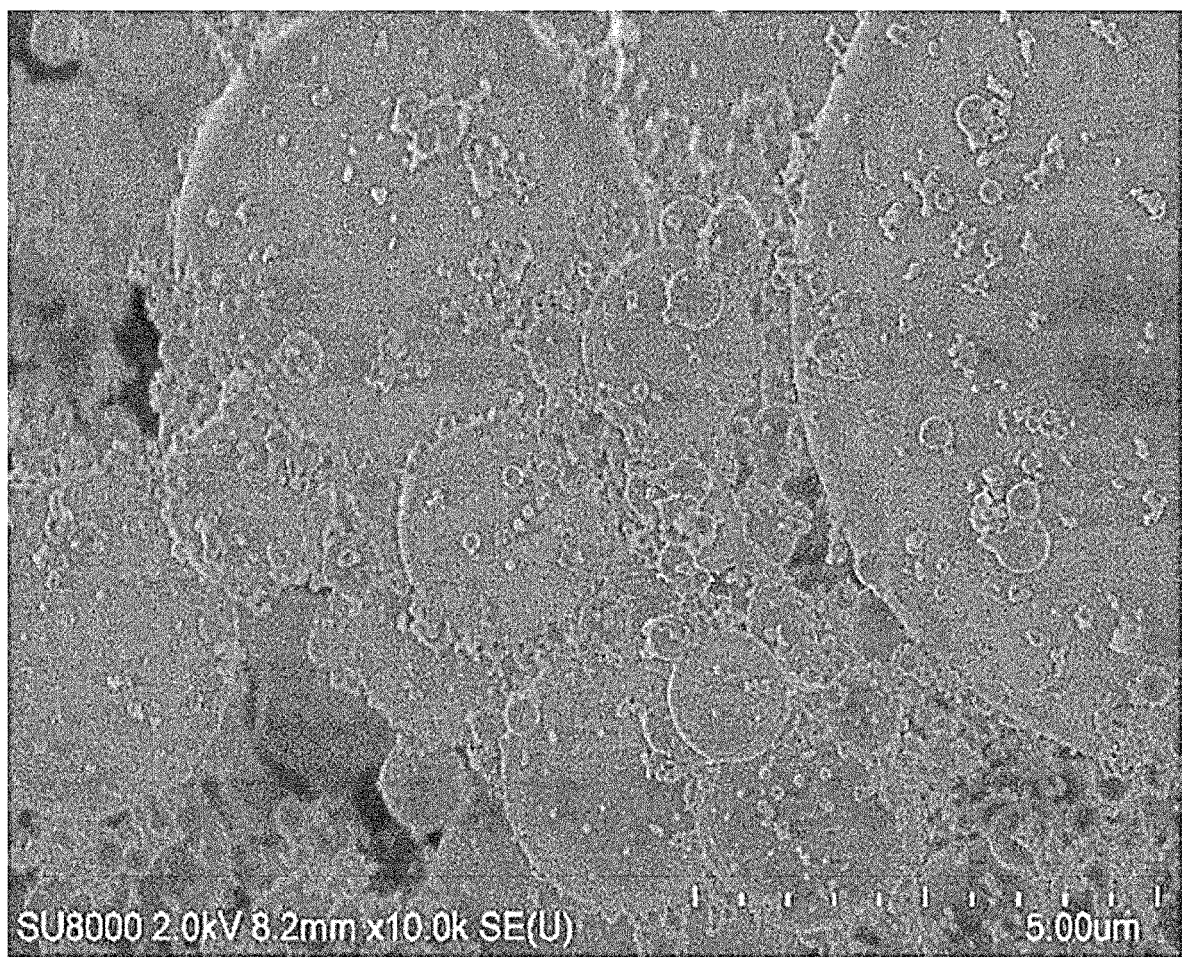
FIG. 4 is an SEM photograph of the test sample in Test Example 5 among the Examples.
Figure 5:
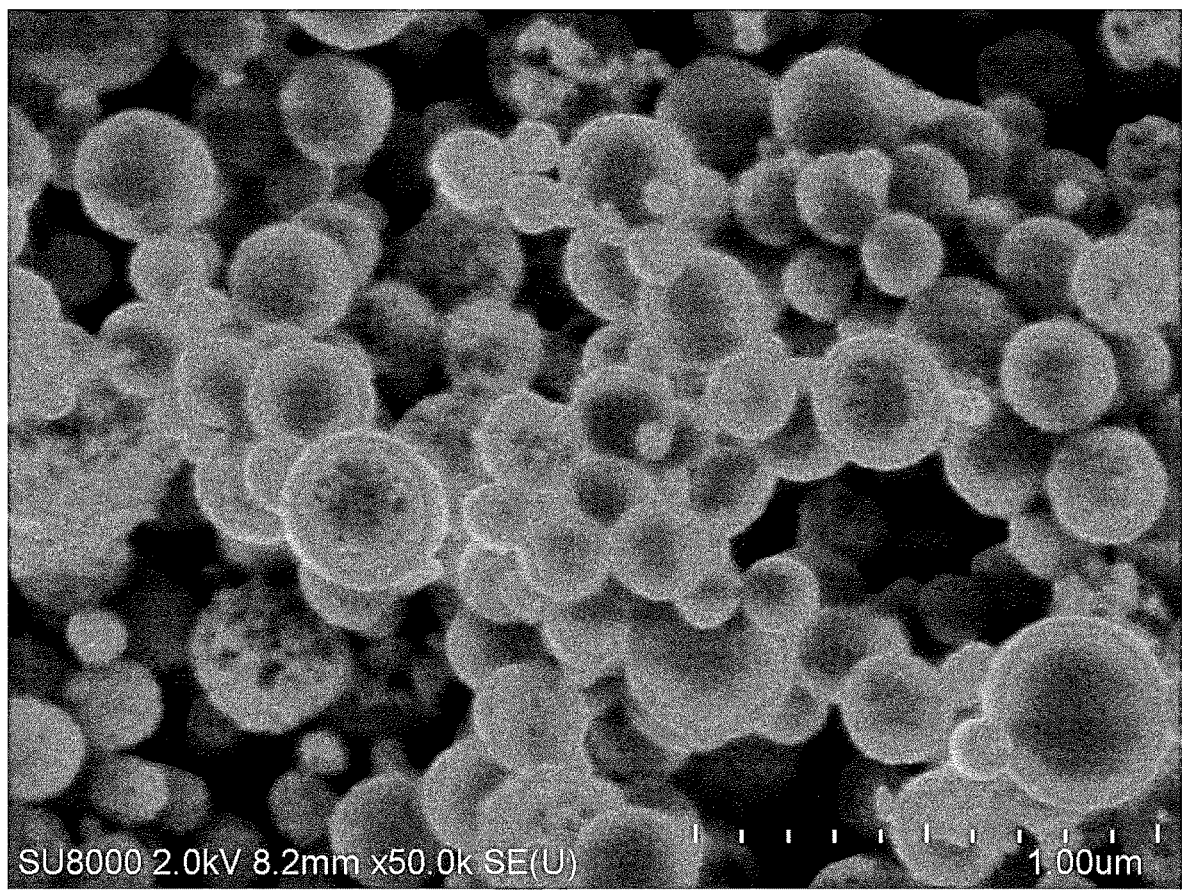
FIG. 5 is an SEM photograph of a test sample in Test Example 6 among the Examples.
Figure 6:
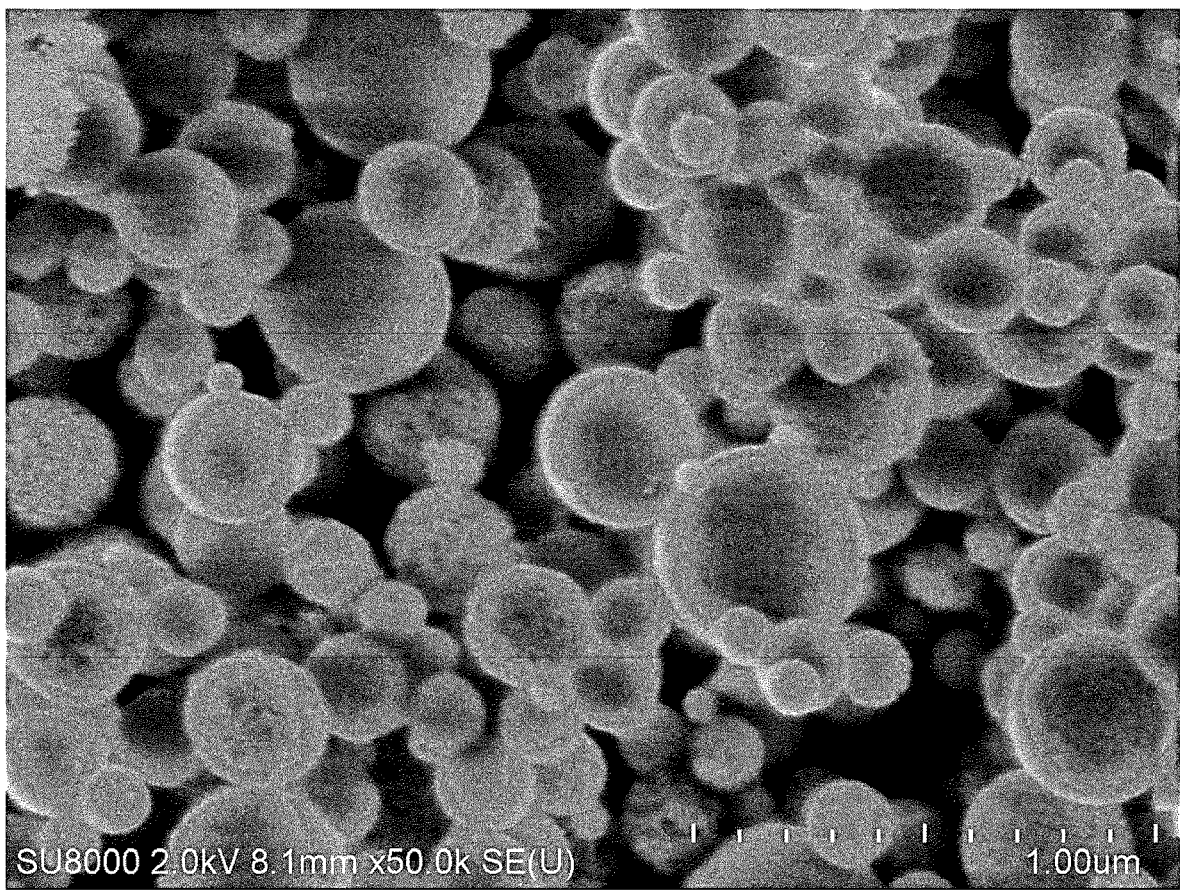
FIG. 6 is an SEM photograph of a test sample in Test Example 7 among the Examples.

Spherical silica particles and a method for producing the same according to the present disclosure will be described in detail on the basis of the following embodiment.
(Spherical Silica Particles)

Spherical silica particles according to the present embodiment are particles that have voids therein and that each have a high sphericity. The spherical silica particles contain silica as a main component. Specifically, with the mass of the entirety being regarded as a reference, 50% or higher of the entirety is formed from silica. Examples of the lower limit value of the composition proportion of the silica include 60%, 70%, 80%, 90%, 95%, and 99%, and the composition proportion of the silica is particularly preferably 100% without containing any other substances except for unavoidable impurities. In a case where a substance other than silica is contained, the substance may be contained in a particulate form inside the spherical silica particles according to the present embodiment or may be contained in a state of being dispersed at an atomic level inside the spherical silica particles.

The spherical silica particles have a particle diameter of 0.1 to 10 μm, and, in particular, the upper limit value of the particle diameter may be set to 7 μm, 5 μm, 3 μm, or 2 μm. The sphericity of each of the spherical silica particles is not particularly limited, but is preferably 0.9 or higher and further preferably 0.95 or higher.

Each of the spherical silica particles according to the present embodiment is a so-called hollow particle. Here, the spherical silica particle being hollow means that the density of the particle is 1.9 g/cm3 or lower. The density is particularly preferably 1.7 g/cm3 or lower and further preferably 1.6 g/cm3 or lower. Examples of the lower limit value of the density include 0.9 g/cm$^3$, and the lower limit value is preferably 1.1 g/cm3 or 1.2 g/cm$^3$.

In measurement of the density of the particle, the volume of the particle is measured by using nitrogen through a constant volume expansion method. A volume with inclusion of voids that do not allow entry of nitrogen gas is measured, and a spherical silica particle having such voids so that the density of the particle falls within the above range is regarded as a hollow particle. The number of the voids existing inside the particle may be one or may be two or more.

The spherical silica particles according to the present embodiment include, in an existence proportion of 60% or lower, particles in each of which a maximum value among major axes of internal voids is not smaller than half a major axis of the particle. The major axes of the internal voids and the major axis of the particle are values measured on a cross section obtained by cutting the spherical silica particles which are in a state of being embedded in a resin.

That is, in a case where the major axis of a cross section of each of the particles is defined as a major axis A of the particle, and one or more of major axes B of cross sections of internal voids existing in the cross section are not smaller than half of A, a "particle in which the maximum value among the major axes of the internal voids is not smaller than half the major axis of the particle" is determined to exist. Even when a plurality of internal voids each having B that is not smaller than half of A are discovered from one spherical silica particle, one "particle in which the maximum value among the major axes of the internal voids is not smaller than half the major axis of the particle" is determined to exist.

10 particles to be subjected to measurement are randomly selected (100 particles may be selected). An existence proportion is calculated as the proportion of the number of existing "particles in each of which the maximum value among the major axes of the internal voids is not smaller than half the major axis of the particle" to 10 (or 100 in the case of selecting 100 particles).

The inside of each of the spherical silica particles preferably has a so-called porous structure in which a large number of fine voids are formed. The inside particularly preferably has fine voids. In a case where the inside of the particle has such a porous structure, a denser structure is preferably formed at a position closer to the surface, and voids having relatively large sizes preferably exist near the center.

For example, the spherical silica particles according to the present embodiment are preferably such that: an average void proportion in a center region of a cross section of each of the spherical silica particles is 5% or higher and 90% or lower; and an average void proportion in an outer shell portion region which is a region of the cross section other than the center region is not higher than the average void proportion in the center region and is 2% or higher and 80% or lower.

Examples of a preferable lower limit value of the average void proportion in the center region include 10%, 20%, and 30%, and examples of a preferable upper limit value of the average void proportion in the center region include 80%, 70%, and 50%. These upper limit values and these lower limit values may be arbitrarily combined.

Examples of a preferable lower limit value of the average void proportion in the outer shell portion region include 3%, 4%, and 5%, and examples of a preferable upper limit value of the average void proportion in the outer shell portion region include 80%, 70%, and 60%. These upper limit values and these lower limit values may be arbitrarily combined.

Evaluations regarding the center region and the outer shell portion region are performed by using an image (evaluation cross section image) showing a cross section having the largest area as a result of comparison among a plurality of cross sections obtained by performing FIB processing in steps of 10 nm to 20 nm by using an FIB/SEM in a state where the spherical silica particles according to the present embodiment are embedded in a resin. Here, the center region refers to a circular region radiating from the center of the particle in the evaluation cross section image and having a size that is half the radius of the particle. The outer shell portion region is a region obtained by excluding the center region from the particle. The average void proportions are calculated by using image processing software (e.g., A-zou-kun manufactured by Asahi Kasei Engineering Corporation) by utilizing the difference among the colors of void portions. This calculation is performed on 10 randomly selected particles, and an average value thereof is calculated.

These voids are preferably not in communication with the outside. In particular, the pore volume of pores that are in communication with the outside is 0.1 mL/g or lower, preferably 0.08 mL/g or lower, and more preferably 0.07 mL/g or lower. Here, the pore volume is measured through a BJH method by using nitrogen, and the volume of pores having diameters of 250 nm or smaller is measured. Here, whether a void is not in communication with the outside is determined according to whether nitrogen gas reaches the void.

Walls defining the voids existing inside the spherical silica particles according to the present embodiment are hardly fractured through pressurization. Specifically, the values of a true specific gravity retention rate and a dielectric loss tangent retention rate between before and after a pressure of 300 MPa is applied for 1 minute are each kept within a fixed range.

The true specific gravity retention rate is a value indicating a rate at which the value of a pre-pressurization true specific gravity is retained without impairment of the voids due to the pressurization. When a hollow structure is fractured at the time of pressurization so that a void previously existing inside is in communication with the outside, the volume of the particle decreases according to the volume of the void, whereby the true specific gravity increases.

Therefore, increase in the true specific gravity subsequently to the pressurization means that the hollow structure has been fractured owing to the pressurization. The true specific gravity retention rate is calculated according to the following expression on the basis of true specific gravities measured with nitrogen gas and a true specific gravity measured with helium gas: (true specific gravity retention rate)={(true specific gravity measured with helium gas)−(true specific gravity measured with nitrogen gas after pressurization test)}/{(true specific gravity measured with helium gas)−(true specific gravity measured with nitrogen gas before pressurization test)}×100(%).

Specifically, the true specific gravity retention rate being 100% means that: the value of the true specific gravity has not changed between before and after the pressurization; and the voids have not been impaired owing to the pressurization. Meanwhile, the true specific gravity retention rate being 0% means that: the value of the post-pressurization true specific gravity is equal to the value of the true specific gravity measured with helium; and all voids that allow entry of helium have been impaired owing to the pressurization. The true specific gravity retention rate relative to the pre-pressurization value is 80% or higher, preferably 85% or higher, and more preferably 90% or higher.

The value of the post-pressurization true specific gravity can be calculated by using a weighted average that is obtained in consideration of the value of the true specific gravity retention rate and that is based on the value of the pre-pressurization true specific gravity and the value of the true specific gravity measured with helium gas. For example, this calculation is performed according to (post-pressurization true specific gravity)={(true specific gravity retention rate)×(pre-pressurization true specific gravity)+(100−(true specific gravity retention rate))×(true specific gravity measured with helium gas)}=100.

The dielectric loss tangent retention rate is calculated according to the following expression on the basis of values of dielectric loss tangents obtained before and after the pressurization: (dielectric loss tangent retention rate)=(post-pressurization dielectric loss tangent)/(pre-pressurization dielectric loss tangent)×100(%). The dielectric loss tangent retention rate is preferably 500% or lower, more preferably 400% or lower, and further preferably 300% or lower. When a hollow structure of any of the particles is fractured, the surface defining the void in the particle is exposed, whereby the dielectric loss tangent increases. Therefore, the dielectric loss tangent retention rate being high means that fracturing of the hollow structure has progressed.

The spherical silica particles according to the present embodiment have a value of D90/D10 of preferably 2.0 to 20.0. In particular, the upper limit value of D90/D10 is preferably 18.0, 15.0, or 13.0, and the lower limit value of D90/D10 is preferably 2.2, 2.4, or 2.6. These upper limit values and these lower limit values may be arbitrarily combined. D10 is the particle diameter of a particle at a position corresponding to 10% on a volume basis from a small particle diameter side, and D90 is the particle diameter of a particle at a position corresponding to 90% on a volume basis from the small particle diameter side.

Furthermore, the spherical silica particles according to the present embodiment have a true specific gravity measured with helium gas, the true specific gravity being preferably 2.2 g/cm3 or higher and further preferably 2.25 g/cm3 or higher. Helium gas also enters a void existing inside a particle and allows measurement of the specific gravity of a particle containing no void. Here, the specific gravity of silica is 2.3 g/cm$^3$, and a specific gravity closer to this value is inferred to mean that the contents of impurities other than silica are lower.

The spherical silica particles according to the present embodiment may be subjected to surface treatment in which an organic functional group is introduced. The organic functional group to be introduced is not particularly limited, and examples of the organic functional group include a phenylamino group, an amino group, a vinyl group, an epoxy group, a phenyl group, an acrylic group, a methacrylic group, an alkyl group, and an organic functional group having any of these organic functional groups at a terminal thereof. A method for introducing these organic functional groups may include performing surface treatment with a surface treatment agent having any of these organic functional groups in the molecular structure thereof. Examples of the surface treatment agent include silane compounds, titanium compounds, and the like. The amount of these organic functional groups to be introduced is appropriately selected as necessary and is, for example, about 10% to 100% with the total of the number of the organic functional groups introduced to the surfaces of the spherical silica particles and the number of OH groups existing on said surfaces being regarded as a reference. The lower limit value of the amount may be set to 30%, 50%, 60%, or the like, and the upper limit value of the amount may be set to 90% or the like.

Slurry Composition

A slurry composition according to the present embodiment contains the above spherical silica particles according to the present embodiment and a dispersion medium in which the spherical silica particles are dispersed. As the spherical silica particles, the aforementioned spherical silica particles may be used. The dispersion medium is in liquid form and is an organic substance, water, or the like. Examples of the organic substance include pre-curing monomers in addition to typical organic solvents. A solute may be dissolved therein. The mixing ratio between the spherical silica particles and the dispersion medium is not particularly limited, and the content of the spherical silica particles may be set to 20% or higher, 40% or higher, or 60% or higher. Furthermore, another component may be contained as necessary. The other component is, for example, a dispersant or the like.

Resin Composition

A resin composition according to the present embodiment contains the above spherical silica particles according to the present embodiment and a resin material in which the spherical silica particles are dispersed. As the spherical silica particles, the aforementioned spherical silica particles may be used. As the resin material, a post-curing resin material in solid form, a pre-curing resin material in liquid form, or the like may be used. The post-curing resin material may be a thermosetting resin or a thermoplastic resin. The specific resin material is not particularly limited, and examples of the specific resin material include epoxy resins, phenol resins, polyimide resins, fluorine resins, polyphenylene oxide resins, and pre-curing monomers and precursors thereof. The mixing ratio between the spherical silica particles and the resin material is not particularly limited, and the content of the spherical silica particles may be set to 20% or higher, 40% or higher, or 60% or higher. Furthermore, another component may be contained as necessary. The other component is, for example, a dispersant or the like. When the resin material is in liquid form as in the case of a precursor or the like, the resin composition according to the present embodiment may be considered as the aforementioned slurry composition.

Method for Producing Spherical Silica Particles

A method for producing the spherical silica particles according to the present embodiment includes a raw material silica particle preparation step, a hydrothermal treatment step, a heating step, and other steps employed as necessary.

Raw Material Silica Particle Preparation Step

The raw material silica particle preparation step is a step of precipitating raw material silica particles, from which the spherical silica particles are to be obtained, in a mixed solvent of water and an organic solvent from silicic acid contained in a raw material solution in the presence of a basic substance so as to obtain a liquid dispersion. The precipitated raw material silica particles are substantially identical to the spherical silica particles to be produced, but have a high water content, a high organic substance content, and the like.

The precipitation of the raw material silica particles is preferably performed while stirring is being performed. The temperature at the time of the precipitation is not particularly limited, examples of the lower limit value of the temperature include 0° C., and examples of the upper limit value of the temperature include 40° C., 50° C., and 60° C.

The concentration of the silicic acid in the raw material solution is not particularly limited. With the mass of the entirety being regarded as a reference, examples of the lower limit value of the concentration include 18, 2%, 3%, and 5% on an oxide ($SiO_2$: silica) basis, and examples of the upper limit value of the concentration include 88, 10%, 15%, and 17% on an oxide ($SiO_2$: silica) basis. In order to obtain a necessary concentration, the raw material solution may be diluted with water, the organic solvent, or the mixed solvent of water and the organic solvent. Here, said oxide basis is for calculating a value on the assumption that all silicon elements are contained in the form of the oxide. Another metal compound different from the silicic acid may be contained in the raw material solution. The other metal compound that may be contained may contain a water-soluble compound and a metal oxide having a particle diameter of 100 nm or smaller (in particular, a metal oxide having a particle diameter of 50 nm or smaller, 30 nm or smaller, or 10 nm or smaller). When the silicic acid is precipitated so as to turn into particles, the other metal oxide is taken in to form a composite oxide or the like.

The precipitation of the raw material silica particles is preferably performed in a state where adjustment to a predetermined pH is performed. The adjustment to the predetermined pH is preferably performed by adding the basic substance or adding an organic acid such as acetic acid. Examples of the lower limit value of the predetermined pH include 7.0, 7.5, and 7.8, and examples of the upper limit value of the predetermined pH include 10.0, 9.5, 9.0, 8.5, and 8.2.

Here, the mixed solvent has a relative permittivity of 21 or higher and 40 or lower. The upper limit value of the relative permittivity may be set to 38, 35, or 33, and the lower limit value of the relative permittivity may be set to 21.5, 23, or 25. These upper limit values and these lower limit values may be arbitrarily combined. Here, the relative permittivity of the mixed solvent refers to a relative permittivity calculated with the mixed solvent being formed from only the contained water and organic solvent. Specifically, the relative permittivity of the mixed solvent is obtained by using a weighted average in terms of a volume ratio on the basis of the relative permittivity of the water and the relative permittivity of the mixed organic solvent.

The organic solvent is a solvent that is mixable with water and with which the relative permittivity falls within the above range after the mixing. Preferable examples of the organic solvent include ketones, esters, and alcohols. In particular, acetone, methyl ethyl ketone, ethyl acetate, and the like are preferably used singly or as a mixture, and acetone is further preferably used. The mixing ratio between the organic solvent and the water is set such that the relative permittivity falls within the aforementioned range when the mixed solvent is obtained.

The basic substance is formed from at least one of a quaternary ammonium and a base having a cyclic amidine structure. The quaternary ammonium and the base having a cyclic amidine structure are not particularly limited, but the quaternary ammonium is preferably selected from among quaternary ammoniums each having 4 to 16 carbon atoms. Particular examples of the quaternary ammonium include tetramethylammonium having 4 carbon atoms, tetraethylammonium having 8 carbon atoms, and tetrabutylammonium having 16 carbon atoms. The quaternary ammonium typically has a certain anion as a counterion. Examples of the quaternary ammonium having a certain anion include: tetramethylammonium hydroxide (TMAH), tetraethylammonium hydroxide (TEAH), and tetrabutylammonium hydroxide (TBAOH) each having a hydroxide ion; and tetramethylammoniumchloride, tetraethylammonium chloride, and tetrabutylammonium chloride each having a chloride ion. Examples of the base having a cyclic amidine structure include diazabicycloundecene (DBU) and diazabicyclononene (DBN).

With the number of moles of a silicon element derived from the silicic acid being regarded as a reference, the basic substance is contained in a ratio of 0.3 or higher and 0.8 or lower. The lower limit value of the ratio may be set to 0.35 or 0.4, and the upper limit value of the ratio may be set to 0.75, 0.7, or 0.6. These upper limit values and these lower limit values may be arbitrarily combined. By setting the addition amount of the basic substance to the lower limit value or larger, raw material silica particles having larger particle diameters are produced so that an aggregate is prevented from being formed, and raw material silica particles having a higher silica density therein are produced. By setting the addition amount to the upper limit value or smaller, formation of an oligomer is prevented, and formation of particles is efficiently performed. When the silica density becomes low, heating in the heating step described later tends to lead to shrinkage, or the spherical silica particles having been obtained tend to have a higher void proportion when being formed into porous particles or hollow particles.

The basic substance may be added into the mixed solvent before or after the silicic acid is added. Furthermore, the basic substance may be gradually added over several times instead of adding the whole amount of the basic substance at once.

The concentration of the silicic acid in the raw material solution is not particularly limited, but, on an oxide basis and with the mass of the raw material solution being regarded as a reference, the upper limit value of the concentration is preferably 0.1%, 0.2%, 0.3%, or 0.4%, and the lower limit value of the concentration is preferably 1.0%, 1.5%, 2.0%, or 3.0%. The silicic acid is preferably supplied as an alkaline silicic acid aqueous solution obtained through any of the following methods "a)" to "c)". Processes in these "a)" to "c)" are preferably performed while stirring is being performed. Appropriate amounts of the organic solvent and the basic substance are added into the alkaline silicic acid aqueous solution obtained through any of the following processes, whereby the raw material solution is prepared.

a) Heating and Pressurizing Silicon Dioxide in a Basic Substance Aqueous Solution As the silicon dioxide, silicon dioxide synthesized from a metal silicon, silicon dioxide synthesized from a silicon compound, natural silicon dioxide, or the like may be used. In particular, silicon dioxide synthesized from a metal silicon is preferable since a high-purity metal silicon is easily obtained as the metal silicon which is a raw material. For example, a particulate formed from silicon dioxide obtained through a method that involves combusting a metal silicon powder (so-called VMC method) may be used. Here, by using a particulate as the silicon dioxide, the specific surface area is increased, and the speed of dissolving the silicon dioxide in the basic substance aqueous solution is increased.

As the basic substance to be contained in the basic substance aqueous solution in which the silicon dioxide is to be dissolved, the aforementioned basic substance may be directly used, or a basic substance (another basic substance) other than the aforementioned basic substance may be used. In the case of using another basic substance, the other basic substance having been used is preferably removed through rinsing or ion exchange after the silicon dioxide is dissolved.

A method for dissolving the silicon dioxide in the basic substance aqueous solution includes: performing pressurization to increase the boiling point of the basic substance aqueous solution; and keeping the basic substance aqueous solution at a temperature of not lower than a boiling point at normal pressure. For example, a condition of performing heating at 180° C. while performing pressurization may be employed. Increase in the temperature for the dissolving leads to improvement of the dissolving speed, and decrease in the temperature for the dissolving leads to decrease in pressure, whereby dissolving equipment is simplified.

With the mass of the entirety being regarded as a reference, the upper limit value of the mass of the silicon dioxide to be dissolved is preferably set to 17%, 15%, or 10%, and the lower limit value of the mass of the silicon dioxide to be dissolved is preferably set to 18, 3%, or 5%. These upper limit values and these lower limit values may be arbitrarily combined. The concentration of the basic substance in the basic substance aqueous solution is not particularly limited but is preferably such a concentration that the basic substance eventually comes to have an appropriate concentration when the raw material solution is prepared.

b) Removing Na Ions from a Sodium Silicate Aqueous Solution in the Presence of a Basic Substance As the sodium silicate aqueous solution, a solution obtained by dissolving sodium silicate in water, i.e. water glass, may be used. As the basic substance, the above basic substance may be used. Na ions are removed from the sodium silicate aqueous solution in the presence of the basic substance, whereby the sodium of the sodium silicate is substituted with the basic substance. The removal of Na ions may be performed by using an ion exchange resin or the like.

On an oxide basis and with the mass of the entirety being regarded as a reference, the upper limit value of the mass of the sodium silicate to be dissolved is preferably set to 17%, 15%, or 10%, and the lower limit value of the mass of the sodium silicate to be dissolved is preferably set to 1%, 3%, or 5%. These upper limit values and these lower limit values may be arbitrarily combined. The concentration of the basic substance in the basic substance aqueous solution is not particularly limited but is preferably such a concentration that the basic substance eventually comes to have an appropriate concentration when the raw material solution is prepared.

c) Dissolving a Metal Silicon in an Aqueous Solution Containing a Basic Substance and/or a Second Basic Substance A metal silicon is immersed and dissolved in an aqueous solution in which the above basic substance and/or a second basic substance has been dissolved, whereby silicic acid is generated. The metal silicon is preferably in the form of a particulate. A condition for the dissolving preferably involves heating. The temperature for the heating is not particularly limited, and the lower limit value of the temperature may be set to 30° C., 40° C., 50° C., 60° C., or the like.

On an oxide basis and with the mass of the entirety being regarded as a reference, the upper limit value of the mass of the metal silicon to be dissolved is preferably set to 17%, 15%, or 10%, and the lower limit value of the mass of the metal silicon to be dissolved is preferably set to 1%, 3%, or 5%. These upper limit values and these lower limit values may be arbitrarily combined.

The basic substance is identical to the above basic substance. The second basic substance is not particularly limited but is preferably formed from an organic substance. Examples of the second basic substance include dialkylamines (e.g., dialkylamines each having 1 to 3 carbon atoms), trialkylamines (e.g., trialkylamines each having 1 to 3 carbon atoms), and the like.

The total concentration of the basic substance and the second basic substance in the aqueous solution containing the basic substance and/or the second basic substance is not particularly limited. In the case of adding the basic substances, the total concentration is preferably such a concentration that the amount of the basic substances eventually becomes an appropriate existence amount or smaller when the raw material solution is prepared.

Hydrothermal Treatment Step

The hydrothermal treatment step is a step of substituting, with water, the dispersion medium in the liquid dispersion obtained in the raw material silica particle preparation step, and then performing heating so as to cause progression of a hydrothermal reaction. The hydrothermal reaction is preferably caused at a temperature of 130° C. or higher and 250° C. or lower. In particular, the lower limit value of the temperature is preferably set to 100° C., 110° C., or 120° C., and the upper limit value of the temperature is preferably set to 220° C., 200° C., or 180° C. These upper limit values and these lower limit values may be arbitrarily combined.

The causation of the hydrothermal reaction leads to formation of voids inside the spherical silica particles which are eventually produced. That is, the hydrothermal step is inferred to lead to occurrence, in a balanced manner, of a reaction in which a portion having a low silanol bond density inside the particles is dissolved by the basic substance and a reaction in which the outer shells of the particles become dense owing to heat, so that voids to be generated inside are controlled by the balance between the two reactions.

Heating Step

The heating step is a step of heating the raw material silica particles contained in the liquid dispersion obtained in the hydrothermal treatment step, thereby obtaining spherical silica particles. Through the heating in this step, the water and the organic substance contained in the raw material silica particles are removed.

The heating in the heating step is performed in a state where: the liquid dispersion is used as is; the dispersion medium in the liquid dispersion is substituted with another dispersion medium; and/or the raw material silicaparticles are subjected to solid-liquid separation from the liquid dispersion. The raw material silica particles are separated from the dispersion medium through centrifugal separation or filtration. After the raw material silica particles are separated, an operation for adding another dispersion medium such as water or an organic solvent is performed, whereby the dispersion medium is substituted. The organic substance contained in the liquid dispersion is more assuredly removed by performing the substitution of the dispersion medium a plurality of times.

The heating step enables removal of the water and the organic substance contained in the raw material silica particles by performing the heating at a high temperature. First, the water and the organic solvent are preferably removed at a temperature that does not lead to rapid removal of water. The temperature is, for example, 40° C., 60° C., 80° C., 100° C., 120° C., 140° C., or the like. Decompression or air-drying may be performed simultaneously with the heating. When the water is removed to a certain extent, the water does not rapidly expand even when being heated at a high temperature, and thus heating is performed until arrival of a temperature that allows removal of the organic substance. The temperature that allows removal of the organic substance is preferably a temperature of 500° C. or higher. In particular, execution of the heating in an oxidizing atmosphere such as air enables oxidation removal of the organic substance, and thus is preferable. The lower limit value of the temperature for the heating may be set to 600° C., 650° C., 700° C., 750° C., 800° C., 850° C., 900° C., or the like, and the upper limit value of the temperature for the heating may be set to 1150° C., 1100° C., 1050° C., or the like. Execution of the heating in a state where the raw material silica particles are separated from the dispersion medium is considered to cause the particles to shrink and become dense in association with removal of the water. In particular, the hollow particles or the porous particles are made firm by being heated to 900° C. or higher.

Other Steps

The method for producing spherical silica particles according to the present embodiment may further include crushing, or performing surface treatment on, the obtained spherical particles. The crushing is performed by a means similar to a means for an ordinary pulverization operation. In particular, a jet mill or the like is preferably used.

The spherical silica particles produced through the method for producing spherical silica particles according to the present embodiment may be subjected to surface treatment with a surface treatment agent such as a silane compound. Appropriate surface treatment varies according to the manner in which the spherical silica particles are used. In a case where a resin is filled with the spherical silica particles, a surface treatment agent allowing introduction of a functional group having high affinity for or reactivity with the resin is preferably used.

EXAMPLES

The method for producing spherical silicaparticles according to the present disclosure will be described in detail on the basis of the following Examples.

Preparation of Samples

Test samples in respective Test Examples were prepared under conditions indicated in Table 1. Hereinafter, description will be given in detail.

Test Example 1

Raw Material Silica Particle Preparation Step

First, an alkaline silicic acid aqueous solution was prepared. 9.0 g of a metal silicon powder (volume-average particle diameter: 20 μm), 27.0 g of ion exchanged water, and 64.0 g of a 25%-by-mass TMAH aqueous solution were mixed, and the mixture was retained at 40° C. for 48 hours so as to dissolve the metal silicon. Consequently, an alkaline silicic acid aqueous solution containing about 26.3% of silicic acid on a silica basis was obtained.

Ion exchanged water was added to the obtained alkaline silicic acid aqueous solution such that the concentration of the silicic acid became 4.5% by mass on a silica basis. The addition was performed such that the existence amount of the TMAH as a basic substance became 0.44 in terms of molar ratio as a whole with a silicon element derived from the contained silicic acid being regarded as a reference. Thereafter, acetone as an organic solvent was added such that a value of 30.6 was obtained when the acetone was mixed with the contained water. Specifically, the mass ratio of the water to the acetone was 20:80 before the mixing.

After stirring was sufficiently performed, a 90%-by-mass acetic acid aqueous solution was added to adjust the pH to 8, and stirring was further performed for 30 minutes. Consequently, raw material silica particles were precipitated, whereby a liquid dispersion was obtained.

Heating Step

The obtained liquid dispersion was subjected to centrifugal separation at 5000 rpm for 5 minutes, and the supernatant was removed through decantation, whereby the precipitate was separated. The centrifugal separation was performed by using Model 3700 manufactured by KUBOTA Corporation. Ion exchanged water was added in a mass equal to the mass of the removed supernatant, and ultrasonic dispersion was performed. The ultrasonic dispersion was performed at 1000 W for 30 minutes with the frequency of an ultrasonic wave being 28 kHz. Centrifugal separation was performed again under the above conditions, and the obtained precipitate was dried at 130° C. for 1 hour, and then, fired at 500° C. for 2 hours. The obtained fired product was crushed by using a mortar until aggregates became visually unrecognizable, to obtain spherical silica particles which were then used as a test sample in this Test Example. Meanwhile, in Test Example 1, the liquid dispersion obtained in the raw material silica particle preparation step was directly subjected to the heating step and was not subjected to any hydrothermal treatment step.

Test Examples 2 and 3

The same operations as the operations in Test Example 1 were performed, except that the firing temperatures were set to 800° C. (Test Example 2) and 1000° C. (Test Example 3). Consequently, test samples in these Test Examples were obtained.

Test Example 4

The same operations as the operations in Test Example 3 were performed, except for a difference in that a hydrothermal treatment step was performed on the liquid dispersion obtained in the raw material silica particle preparation step. Consequently, a test sample in this Test Example was obtained.

The hydrothermal treatment step was performed as follows. That is, the liquid dispersion obtained in the raw material silica particle preparation step was subjected to centrifugal separation at 5000 rpm for 5 minutes, and the supernatant was removed through decantation, whereby the precipitate was separated. The centrifugal separation was performed by using Model 3700 manufactured by KUBOTA Corporation. Ion exchanged water was added in a mass equal to the mass of the removed supernatant, and ultrasonic dispersion was performed. The ultrasonic dispersion was performed at 1000 W for 30 minutes with the frequency of an ultrasonic wave being 28 kHz. The obtained liquid dispersion was put into a pressure container, and then, subjected to a hydrothermal reaction at 175° C. for 2 hours.

Test Example 5

The same operations as the operations in Test Example 4 were performed, except that the existence amount of the basic substance was set to 0.79 in terms of molar ratio with the silicon element derived from the silicic acid being regarded as a reference. Consequently, a test sample in this Test Example was obtained.

Test Examples 6 to 10

The same operations as the operations in Test Example 4 were performed except for the following differences. Consequently, test samples in these Test Examples were obtained.

a) Each of the existence amounts of the basic substance was set to 0.55 (Test Examples 6 to 9) or 0.35 (Test Example 10) in terms of molar ratio with the silicon element derived from the silicic acid being regarded as a reference. b) Each of the hydrothermal treatment temperatures was set to 150° C. (Test Example 6), 121° C. (Test Example 7), or be unchanged, i.e. 175° C. (Test Examples 8 to 10). c) Each of the firing temperatures in the heating step was set to 800° C. (Test Example 8) or be unchanged, i.e. 1000° C. (Test Examples 6, 7, 9, and 10).

Test Example 11

Corresponding to Raw Material Silica Particle Preparation Step

A liquid mixture formed from 5.2 g of TEOS, 100 g of ion exchanged water, and 400 g of acetone was prepared. 2.5 g of a 25%-by-mass TMAH aqueous solution was added to the liquid mixture while stirring was being performed. Thereafter, a 90%-by-mass acetic acid aqueous solution was swiftly added to adjust the pH to 8, and stirring was further performed for 30 minutes. Consequently, raw material silica particles were precipitated, whereby a liquid dispersion was obtained. Here, the ratio between the ion exchanged water and the acetone was set such that the relative permittivity became 30.6. The addition amount of the TMAH was set to 0.27 in terms of molar ratio with a silicon element derived from silicic acid derived from the TEOS being regarded as a reference.

Corresponding to Hydrothermal Treatment Step

The obtained liquid dispersion was subjected to centrifugal separation at 5000 rpm for 5 minutes, and the supernatant was removed through decantation, whereby the precipitate was separated. The centrifugal separation was performed by using Model 3700 manufactured by KUBOTA Corporation. Ion exchanged water was added in a mass equal to the mass of the removed supernatant, and ultrasonic dispersion was performed. The ultrasonic dispersion was performed at 1000 W for 30 minutes with the frequency of an ultrasonic wave being 28 kHz. The obtained liquid dispersion was put into a pressure container, and then, subjected to a hydrothermal reaction at 175° C. for 2 hours.

Corresponding to Heating Step

Then, centrifugal separation was further performed again under the above conditions, and the obtained precipitate was dried at 130° C. for 1 hour, and then, fired at 1000° C. for 2 hours. The obtained fired product was crushed by using a mortar until aggregates became visually unrecognizable, to obtain spherical silica particles which were then used as a test sample in this Test Example.

Test Example 12

The same operations as the operations in Test Example 3 were performed, except that the content of the acetone was such an amount that a value of 20 was obtained when the acetone was mixed with the contained water. As a result, generation of particles was not observed in the step corresponding to the raw material silica particle preparation step, and the heating step was not performed. Therefore, no test sample was obtained in this Test Example.

Test Example 13

The same operations as the operations in Test Example 1 were performed, except that the content of the acetone was such an amount that a value of 41.5 was obtained when the acetone was mixed with the contained water. In the raw material silica particle preparation step, spherical particles were not generated, and only aggregates were obtained.

Test Example 14

The same operations as the operations in Test Example 1 were performed, except that the existence amount of the basic substance was set to 0.20 in terms of molar ratio with the silicon element derived from the silicic acid being regarded as a reference. In the raw material silica particle preparation step, spherical particles were not generated, and only aggregates were obtained.

Test Example 15

The same operations as the operations in Test Example 1 were performed, except that the existence amount of the basic substance was set to 0.85 in terms of molar ratio with the silicon element derived from the silicic acid being regarded as a reference. As a result, generation of particles was not observed in the step corresponding to the raw material silica particle preparation step, and the heating step was not performed. Therefore, no test sample was obtained in this Test Example.

Test Examples 16 and 17

The same operations as the operations in Test Example 4 were performed, except that each of the existence amounts of the basic substance was set to 0.35 (Test Example 16) or 0.54 (Test Example 17) in terms of molar ratio with the silicon element derived from the silicic acid being regarded as a reference. Consequently, test samples in these Test Examples were obtained.

Test Examples 18 and 19

The same operations as the operations in Test Example 4 were performed, except that DBU (Test Example 18) and DBN (Test Example 19) were used as basic substances instead of TMAH. Consequently, test samples in these Test Examples were obtained. The addition amounts of the DBU and the DBN were each set to be equal to the addition amount of the TMAH. As a result, the addition amount of each of the DBU and the DBN was set such that the existence amount of the basic substance became 0.41 in terms of molar ratio with the silicon element derived from the silicic acid being regarded as a reference.

Test Examples 20 and 21

The same operations as the operations in Test Example 4 were performed, except that TEAH (Test Example 20) and TBAOH (Test Example 21) were used as basic substances instead of TMAH. Consequently, test samples in these Test Examples were obtained. The addition amounts of the TEAH and the TBAOH were each set to be equal to the concentration of the TMAH. As a result, the addition amount of each of the TEAH and the TBAOH was set such that the existence amount of the basic substance became 0.32 (Test Example 20) or 0.35 (Test Example 21) in terms of molar ratio with the silicon element derived from the silicic acid being regarded as a reference.

Test Example 22

CellSpheres manufactured by TAIHEIYO CEMENT CORPORATION was directly used. CellSpheres is spherical particles formed from alumina borosilicate glass having a hollow structure in which the particle diameter is 10 μm or smaller.

Test Example 23

Hollow silica particles described in relation to Example 8 among Examples in Patent Literature 2 were used. Specifically, hollow silica particles were prepared on the basis of the description in paragraphs [0088] to [0093] of Patent Literature 2. The obtained hollow silica particles had a volume-average particle diameter of 0.5 μm.

Test Example 24

Spherical silica particles were produced through a so-called VMC method in which the metal silicon powder used for preparing the alkaline silicic acid aqueous solution in the raw material silica particle preparation step in Test Example 9 was, in a state of being dispersed in air serving as carrier gas, supplied into a high-temperature oxidizing atmosphere so as to be deflagrated and was rapidly cooled. The produced spherical silica particles were used as a test sample in this Test Example. The contents of impurities of the test sample in this Test Example and the test sample in Test Example 9 were measured. The results are indicated in Table 2.

Evaluation

For each of the test samples in the respective Test Examples, a particle size distribution, a specific surface area, a pore volume, and a true specific gravity were measured. The results are indicated in Table 1.

Particle size distribution: Each of the test samples was dispersed in water so as to have a concentration of 0.5% by mass, and a particle size distribution was measured by using a particle diameter distribution measurement device (SALD-7500nano manufactured by Shimadzu Corporation). For Test Examples 4, 5, 9, and 11, histograms of the respective measured particle size distributions are shown in FIG. 1.

Large-internal-void particle proportion: For each of the test samples in Test Examples 11, 17, 22, and 23, the proportion of particles having large internal voids was measured and is indicated in Table 3. The large internal voids refer to internal voids each having a major axis that was 50% or higher of the particle diameter (major axis) of the corresponding spherical silica particle, the particle diameter (major axis) being regarded as a reference.

The major axes of the internal voids and the major axis of the particle were measured on a cross section obtained by cutting the spherical silica particles which were in a state of being embedded in a resin. First, a liquid epoxy resin (ZX1059) and the test sample were mixed. Then, an appropriate amount of a curing agent (ETHACURE 100) was added and mixed. Then, the mixture was heated at 170° C. so as to be cured. The obtained cured resin product was cut, and the resultant cross section was polished. Furthermore, surface treatment was performed by using an ion milling device (manufactured by Hitachi High-Tech Corporation), osmium coating was performed, and an SEM photograph was taken.

10 particles were randomly selected from among particles existing on this cross section. The major axis of a cross section of each of these particles was defined as a major axis A of the particle, the longest one of the major axes of cross sections of internal voids existing on this cross section was defined as B, and the proportion of particles in each of which B/A was 0.5 or higher was calculated.

Particle internal void distribution: For each of the test samples in Test Examples 11, 17, 22, and 23, the test sample in the Test Example was, in a state of being embedded in a resin, cut through the same method as the method performed in the above large-internal-void particle proportion test in a state where the test sample was embedded in the resin, and a distribution state of voids in the resultant cross section (the proportion of the area of the voids) was evaluated and is indicated in Table 3.

The cross section was obtained as described above. That is, from among images showing a plurality of cross sections obtained in steps of 10 nm by using an FIB/SEM, an image showing a cross section having the largest area was selected as an evaluation cross section image. In the evaluation cross section image, the proportion of the area of voids in a center region (a circular region radiating from the center of the cross section and having a size that was half the radius of the cross section) and the proportion of the area of voids in an outer shell portion region (a region obtained by excluding the center region from the cross section of the particle) were obtained. The proportions of the areas were calculated by using image processing software (A-zou-kun manufactured by Asahi Kasei Engineering Corporation). This calculation was performed on 10 randomly selected particles, and an average value thereof was calculated.

Specific surface area and pore volume: Each of the test samples was subjected to measurement by using an automatic specific surface area/pore distribution measurement device (TriStar 3000 manufactured by Shimadzu Corporation). The specific surface area was measured through a BET single point method by using nitrogen gas. As the pore volume, a value at the time of attraction measured through a BJH method was used.

True specific gravity: Measurement was performed with nitrogen gas by using a dry automatic densimeter (AccuPycII 1345 manufactured by Shimadzu Corporation). A density was measured by using a particle volume with inclusion of voids that did not allow entry of nitrogen gas and that were inside the spherical silica particles. This measurement is based on the fact that existence of voids leads to decrease in the density of the spherical silica particles according to the volume of the voids.

Dielectric characteristics: A relative permittivity and a dielectric loss tangent were measured through a cavity resonance method under a condition of 1 GHz by using a device manufactured by KEYCOM Corp.

Pressurization test: 1.5 g of each of the test samples was put into a vacuum pack which was then deaerated, and pressurization was performed underwater at a pressure of 300 MPa for 1 minute by using a cold isostatic pressing device (manufactured by Nikkiso Co., Ltd.).

SEM: For each of the test samples in Test Examples 3 to 7, 9, 11, 13, and 16 to 19, an SEM photograph was taken.

Figure 7:
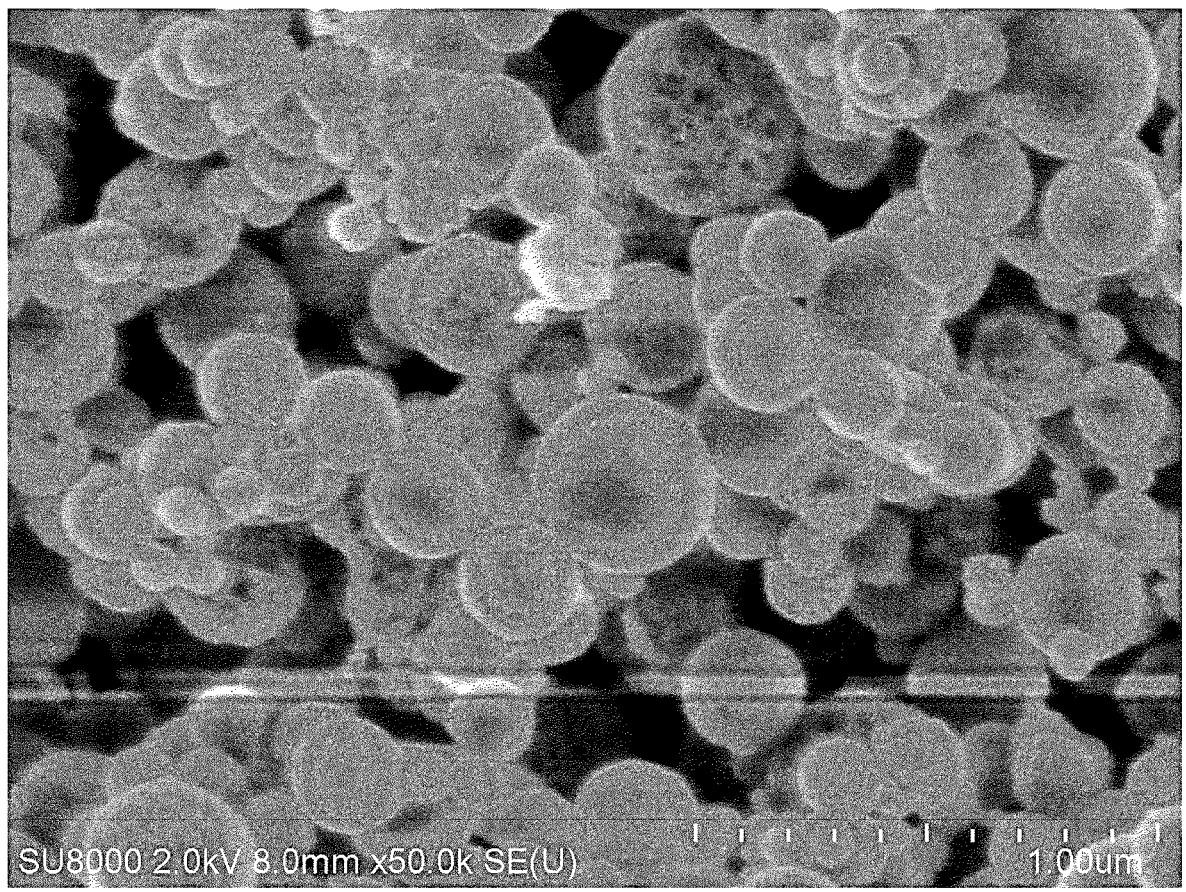
FIG. 7 is an SEM photograph of the test sample in Test Example 9 among the Examples.

TEM: Each of the test samples was embedded in a resin, and a TEM photograph was taken. First, the liquid epoxy resin (ZX1059) and the test sample were mixed. Then, an appropriate amount of the curing agent (ETHACURE 100) was added and mixed. Then, the mixture was heated at 170° C. so as to be cured. The obtained cured resin product was cut, and the resultant cross section was polished. Furthermore, surface treatment was performed by using the ion milling device (manufactured by Hitachi High-Tech Corporation), osmium coating was performed, and a TEM photograph was taken (FIG. 7).

SEM: The same process as the process performed with the above TEM was performed, and an SEM photograph was taken.

TABLE 1

| | Test Example 1 | Test Example 2 | Test Example 3 | Test Example 4 | Test Example 5 | Test Example 6 | Test Example 7 | Test Example 8 | Test Example 9 | Test Example 10 |
|---|---|---|---|---|---|---|---|---|---|---|
| Si source | Silicic acid | Silicic acid | Silicic acid | Silicic acid | Silicic acid | Silicic acid | Silicic acid | Silicic acid | Silicic acid | Silicic acid |
| Solvent permittivity | 30.6 | 30.6 | 30.6 | 30.6 | 30.6 | 30.6 | 30.6 | 30.6 | 30.6 | 30.6 |
| Base | TMAH | TMAH | TMAH | TMAH | TMAH | TMAH | TMAH | TMAH | TMAH | TMAH |
| Base (mol)/Si (mol) | 0.44 | 0.44 | 0.44 | 0.44 | 0.79 | 0.55 | 0.55 | 0.55 | 0.55 | 0.35 |
| pH | 8 | 8 | 8 | 8 | 8 | 8 | 8 | 8 | 8 | 8 |
| Hydrothermal treatment | Not performed | Not performed | Not performed | 175° C. | 175° C. | 150° C. | 121° C. | 175° C. | 175° C. | 175° C. |
| Firing temperature (° C.) | 500° C. | 800° C. | 1000° C. | 1000° C. | 1000° C. | 1000° C. | 1000° C. | 800° C. | 1000° C. | 1000° C. |
| Particle diameter D10 (μm) | 0.15 | 0.15 | 0.15 | 0.15 | 1.5 | 0.15 | 0.15 | 0.52 | 0.52 | 0.09 |
| Particle diameter D50 (μm) | 0.21 | 0.21 | 0.21 | 0.21 | 6.8 | 0.21 | 0.21 | 1 | 1 | 0.14 |
| Particle diameter D90 (μm) | 0.52 | 0.52 | 0.52 | 0.52 | 17.1 | 0.52 | 0.52 | 1.67 | 1.67 | 0.25 |
| D90/D10 | 3.5 | 3.5 | 3.5 | 3.5 | 11.4 | 3.5 | 3.5 | 3.2 | 3.2 | 2.8 |
| Specific surface area | 322.3 | 95.9 | 13.5 | 22.3 | 3.5 | 34.7 | 53.6 | 23.0 | 23.0 | 58.3 |
| Pore volume (cc/g) [BJH adsorption] | 0.063 | 0.042 | 0.039 | 0.066 | — | 0.098 | 0.167 | 0.054 | 0.076 | — |
| Na content (ppm) | <1 | <1 | <1 | <1 | <1 | <1 | <1 | <1 | <1 | <1 |
| True specific gravity (nitrogen) | — | — | 2.3 | 1.6 | 1.5 | 1.8 | 2 | 1.6 | 1.6 | 1.7 |
| True specific gravity (helium) | — | — | 2.3 | 2.3 | 2.3 | 2.3 | 2.3 | 2.3 | 2.3 | 2.3 |
| Permittivity at 1 GHz | — | — | 4.2 | — | — | — | — | — | 3.3 | — |
| Dielectric loss tangent at 1 GHz | — | — | 0.004 | — | — | — | — | — | 0.004 | — |
| True specific gravity (nitrogen) after pressurization at 300 MPa | — | — | — | — | — | — | — | — | — | — |
| True specific gravity (nitrogen) retention rate (%) | — | — | — | — | — | — | — | — | — | — |
| Permittivity at 1 GHz after pressurization at 300 MPa | — | — | — | — | — | — | — | — | — | — |
| Dielectric loss tangent at 1 GHz after pressurization at 300 MPa | — | — | — | — | — | — | — | — | — | — |
| Dielectric loss tangent retention rate (%) | — | — | — | — | — | — | — | — | — | — |

TABLE 1-continued

| | Test Example 11 | Test Example 12 | Test Example 13 | Test Example 14 | Test Example 15 | Test Example 16 | Test Example 17 | Test Example 18 | Test Example 19 | Test Example 20 |
|---|---|---|---|---|---|---|---|---|---|---|
| Si source | TEOS | Silicic acid | Silicic acid | Silicic acid | Silicic acid | Silicic acid | Silicic acid | Silicic acid | Silicic acid | Silicic acid |
| Solvent permittivity | 30.6 | 20 | 41.5 | 30.6 | 30.6 | 30.6 | 30.6 | 30.6 | 30.6 | 25.6 |
| Base | TMAH | TMAH | TMAH | TMAH | TMAH | TMAH | TMAH | DBU | DBN | TEAH |
| Base (mol)/Si (mol) | 0.27 | 0.44 | 0.44 | 0.20 | 0.85 | 0.35 | 0.54 | 0.41 | 0.41 | 0.32 |
| pH | 8 | 8 | 8 | 8 | 8 | 8 | 8 | 8 | 8 | 8 |
| Hydrothermal treatment | 175° C. | No particle generated | No formation of spherical particles | No formation of spherical particles | No particle generated | 175° C. | 175° C. | 175° C. | 175° C. | 175° C. |
| Firing temperature (° C.) | 1000° C. | | | | | 1000° C. | 1000° C. | 1000° C. | 1000° C. | 1000° C. |
| Particle diameter D10 (μm) | 0.33 | | | | | 0.46 | 0.52 | 0.15 | 0.18 | 0.15 |
| Particle diameter D50 (μm) | 0.46 | | 20< | 20< | | 0.74 | 1 | 0.21 | 0.25 | 0.41 |
| Particle diameter D90 (μm) | 0.58 | | | | | 1.48 | 1.67 | 0.52 | 0.66 | 0.74 |
| D90/D10 | 1.8 | — | — | — | — | 3.2 | 3.2 | 3.5 | 3.7 | 4.9 |
| Specific surface area | 7.11 | — | — | — | — | 9.6 | 5.1 | 40.1 | 25.8 | — |
| Pore volume (cc/g) [BJH adsorption] | — | — | — | — | — | — | — | — | — | — |
| Na content (ppm) | <1 | <1 | <1 | <1 | <1 | <1 | <1 | <1 | <1 | <1 |
| True specific gravity (nitrogen) | 1.4 | — | — | — | — | 1.6 | 1.4 | 1.6 | 1.7 | 1.7 |
| True specific gravity (helium) | 2.3 | — | — | — | — | 2.3 | 2.3 | 2.3 | 2.3 | 2.3 |
| Permittivity at 1 GHz | 2.7 | — | — | — | — | 3.3 | 2.8 | 3.5 | — | — |
| Dielectric loss tangent at 1 GHz | 0.001 | — | — | — | — | 0.004 | 0.003 | 0.010 | — | — |
| True specific gravity (nitrogen) after pressurization at 300 MPa | 1.5 | — | — | — | — | 1.7 | 1.5 | — | — | — |
| True specific gravity (nitrogen) retention rate (%) | 84 | — | — | — | — | 90 | 91 | — | — | — |
| Permittivity at 1 GHz after pressurization at 300 MPa | — | — | — | — | — | 3.4 | 2.8 | — | — | — |
| Dielectric loss tangent at 1 GHz after pressurization at 300 MPa | — | — | — | — | — | 0.007 | 0.007 | — | — | — |
| Dielectric loss tangent retention rate (%) | — | — | — | — | — | 171 | 268 | — | — | — |

TABLE 1-continued

| | Test Example 21 | Test Example 22 | Test Example 23 |
|---|---|---|---|
| Si source | Silicic acid | — | — |
| Solvent permittivity | 21.7 | — | — |
| Base | TBAOH | — | — |
| Base (mol)/Si (mol) | 0.35 | — | — |
| pH | 8 | — | — |
| Hydrothermal treatment | 175° C. | — | — |
| Firing temperature (° C.) | 1000° C. | — | — |
| Particle diameter D10 (μm) | 0.46 | — | — |
| Particle diameter D50 (μm) | 0.74 | — | — |
| Particle diameter D90 (μm) | 1.48 | — | — |
| D90/D10 | 3.2 | — | — |
| Specific surface area | — | — | 13.3 |
| Pore volume (cc/g) [BJH adsorption] | — | — | — |
| Na content (ppm) | <1 | 100 | 11 |
| True specific gravity (nitrogen) | 1.8 | 0.7 | 1.1 |
| True specific gravity (helium) | 2.3 | — | — |
| Permittivity at 1 GHz | — | 1.9 | 2.3 |
| Dielectric loss tangent at 1 GHz | — | 0.005 | 0.001 |
| True specific gravity (nitrogen) after pressurization at 300 MPa | — | 2.3 | 1.3 |
| True specific gravity (nitrogen) retention rate (%) | — | 0 | 86 |
| Permittivity at 1 GHz after pressurization at 300 MPa | — | — | 2.7 |
| Dielectric loss tangent at 1 GHz after pressurization at 300 MPa | — | — | 0.006 |
| Dielectric loss tangent retention rate (%) | — | — | 600 |

As is obvious from Table 1, in each of Test Examples 4 to 10 and 16 to 21 in which the hydrothermal treatment step was performed, the true specific gravity measured with nitrogen gas was significantly lower than the true specific gravity measured with helium gas (2.3 g/cm³), and thus voids obviously existed inside the particles. Meanwhile, in Test Example 3 in which the hydrothermal treatment step was not performed, both the true specific gravity measured with nitrogen gas and the true specific gravity measured with helium gas were 2.3 g/cm³ which was approximately equal to the true specific gravity of silica, and thus voids were found to be absent inside. Therefore, execution of the hydrothermal treatment step was found to lead to effective formation of spherical silica particles (hollow particles) having voids therein. When each of the corresponding SEM photographs was observed, pores were hardly recognized on the surfaces, or only few pores were recognized. In addition, the particle diameters in each of these test samples were not close to one another as is obvious from the corresponding SEM photograph, and the particle diameters being not close to one another is obvious also from the particle size distributions shown in FIG. 1.

The hollow particles in a group of Test Examples 1 to 3 were obtained by performing treatment under the same conditions except for the firing temperature, and the hollow particles in a group of Test Examples 8 and 9 were obtained by performing treatment under the same conditions except for the firing temperature. Consequently, change in the firing temperature was found to lead to change in the pore volume.

The hollow particles in Test Examples 6, 7, and 9 were obtained under the same conditions except for a difference in the treatment temperature in the hydrothermal treatment step. Consequently, change in a condition for the hydrothermal treatment was found to lead to changes in the values of the particle size distribution and the pore volume. In particular, change in the temperature in the hydrothermal treatment enabled control of voids to be formed inside the particles. For example, when the temperature in the hydrothermal treatment step was low, the pore volume of pores in communication with the outside tended to increase.

Figure 9:
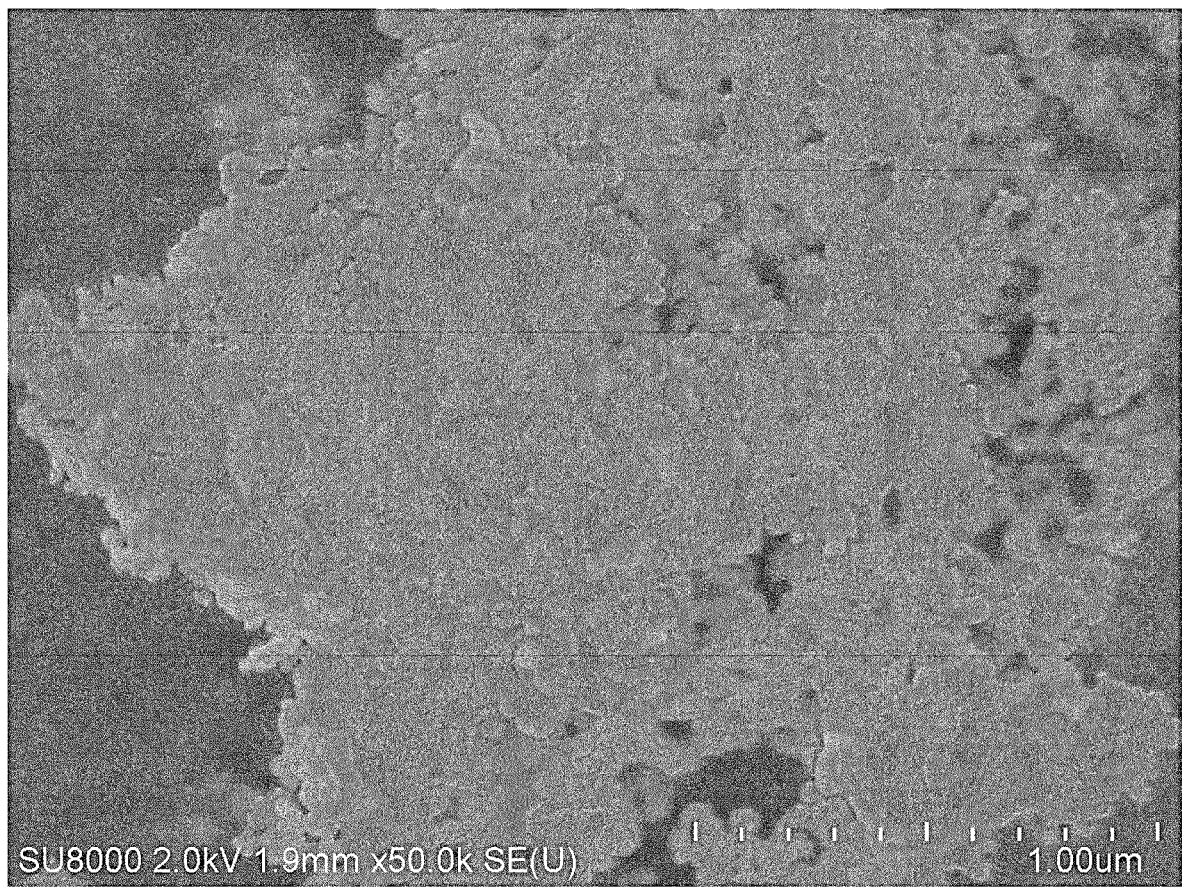
FIG. 9 is an SEM photograph of a test sample in Test Example 13 among the Examples.
Figure 10:
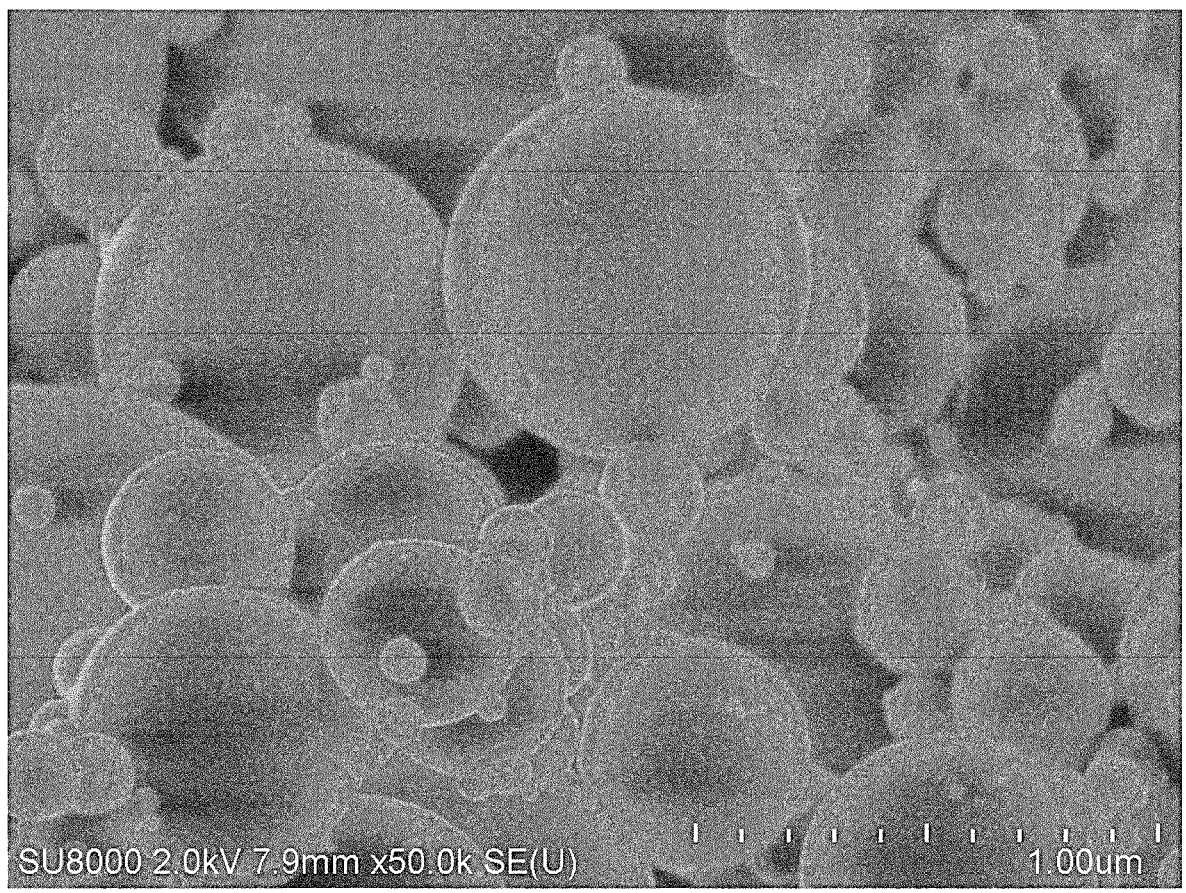
FIG. 10 is an SEM photograph of a test sample in Test Example 16 among the Examples.
Figure 11:
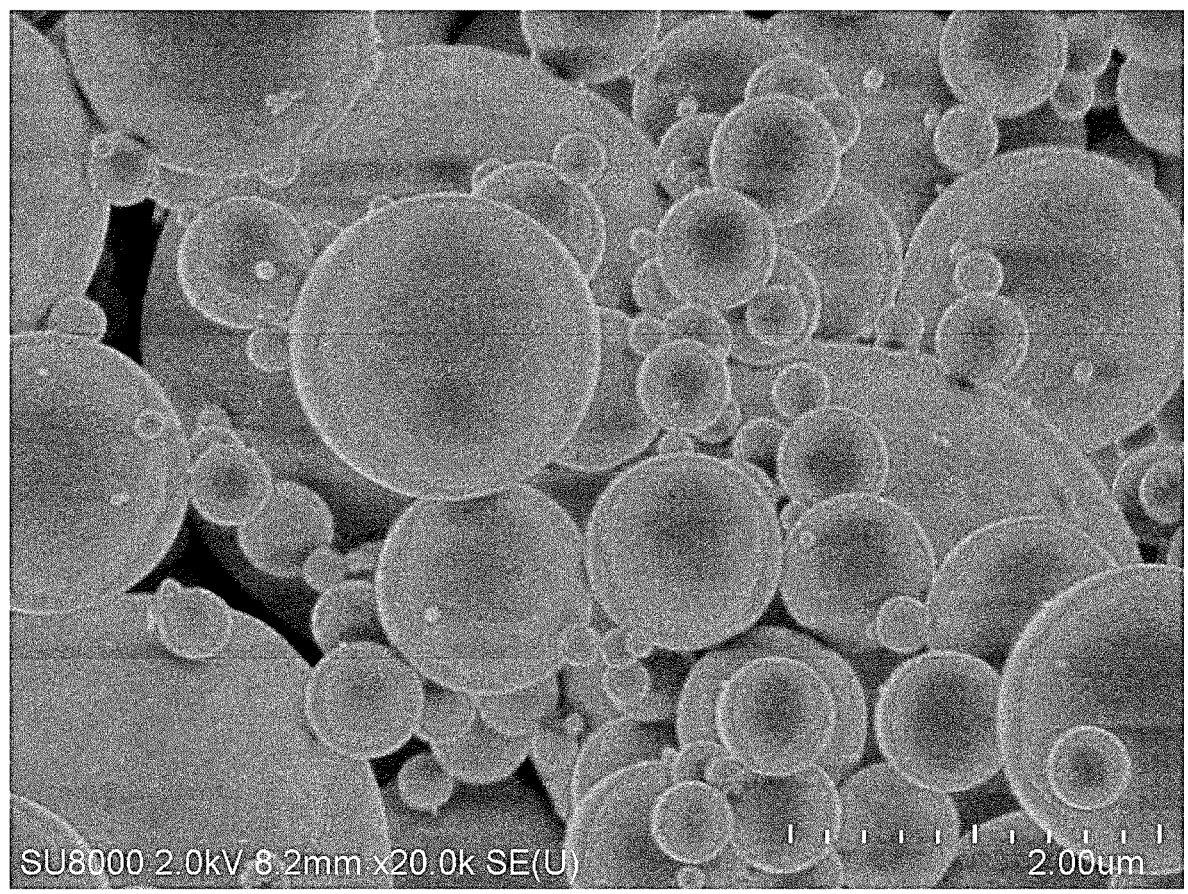
FIG. 11 is an SEM photograph of a test sample in Test Example 17 among the Examples.
Figure 12:
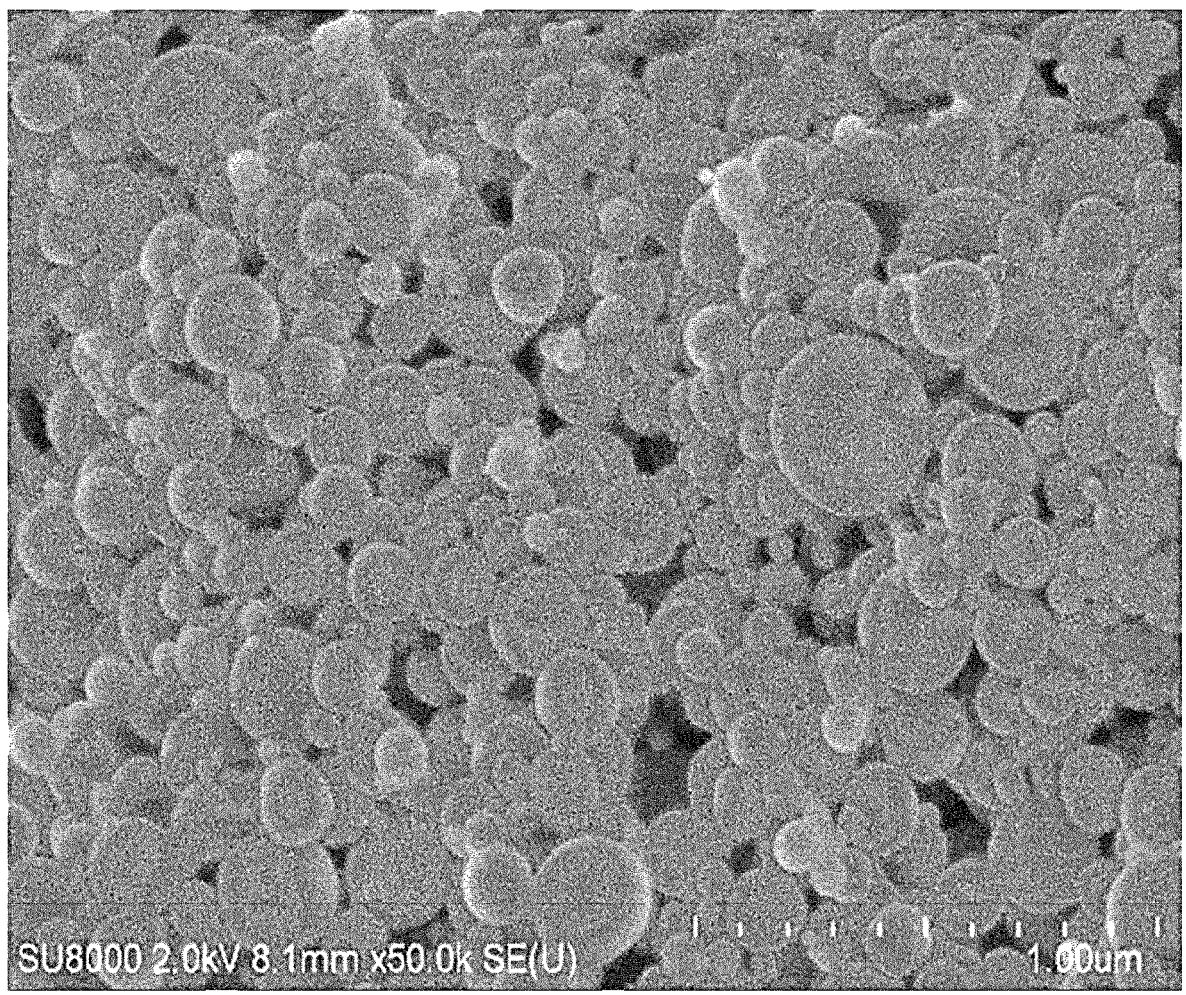
FIG. 12 is an SEM photograph of a test sample in Test Example 18 among the Examples.
Figure 13:
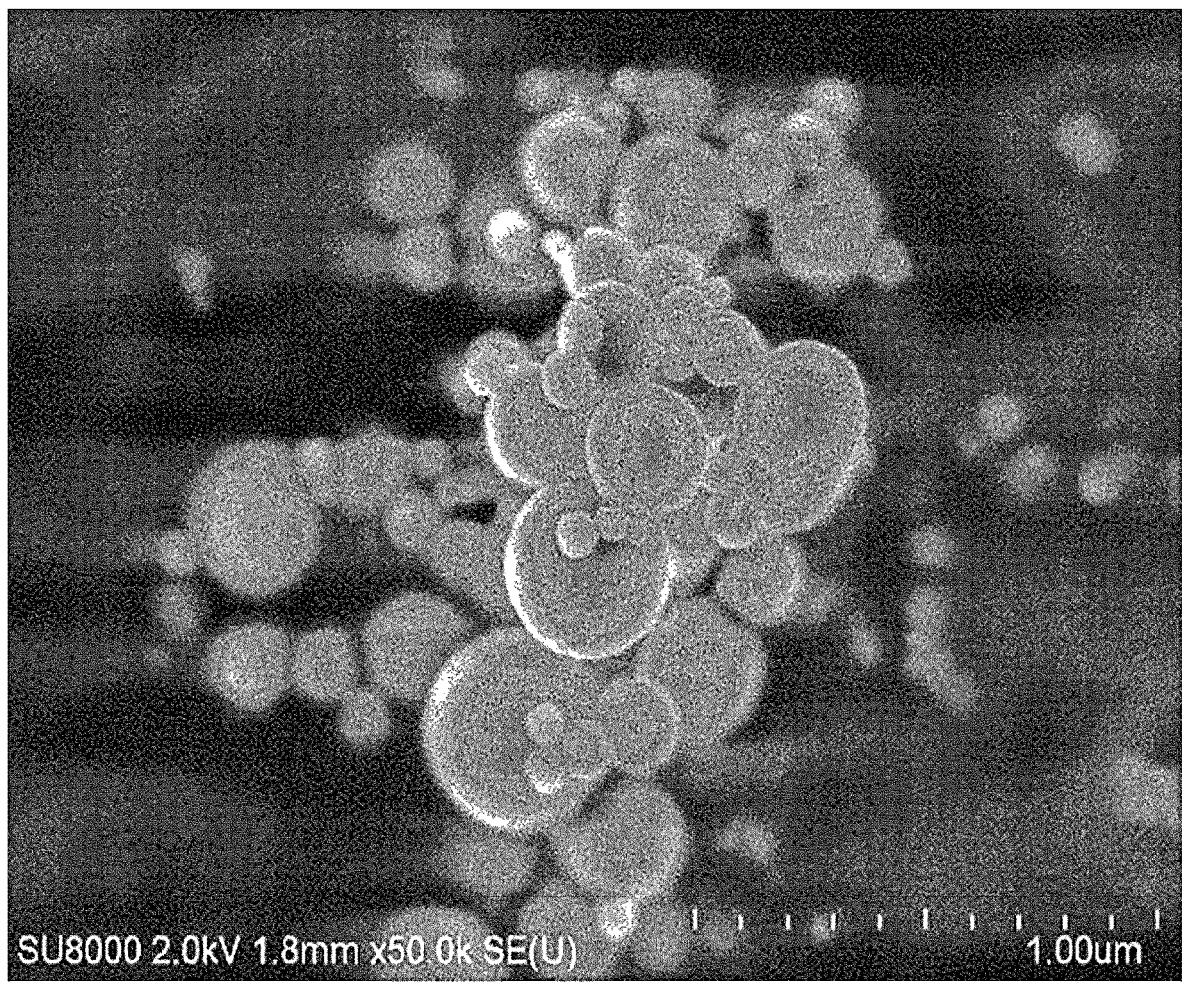
FIG. 13 is an SEM photograph of a test sample in Test Example 19 among the Examples.

The spherical silica particles in Test Examples 4, 12, and 13 were obtained under the same conditions except for a difference in the relative permittivity of the mixed solvent of water and the organic solvent. These Test Examples provide a finding that, when the relative permittivity of the mixed solvent is 20 (Test Example 12) or 41.5 (Test Example 13), spherical silica particles are not obtained. Specifically, in Test Example 12 in which the relative permittivity was low, no precipitate was generated so that formation of particles did not occur, and, in Test Example 13, only aggregates were obtained as is obvious from FIG. 9. These results provide a finding that the relative permittivity of the mixed solvent is required to be higher than 20 and lower than 41.5.

The spherical silica particles in Test Examples 4, 5, 9, 10, and 14 to 17 were obtained under the same conditions except for a difference in the amount of the basic substance. These Test Examples provide a finding that, when the addition amount of the basic substance is 0.20 (Test Example 14) or 0.85 (Test Example 15) in terms of molar ratio with the silicon element derived from the silicic acid being regarded as a reference, spherical silica particles themselves are not obtained. Here, in Test Example 14 in which the addition amount of the basic substance was low, only aggregates were generated, and, in Test Example 15 in which the addition amount of the basic substance was high, no precipitate was generated so that formation of particles did not occur. These results provide a finding that the addition amount of the basic substance is required to be higher than 0.20 and lower than 0.85 in terms of molar ratio with the silicon element derived from the silicic acid being regarded as a reference.

Figure 8:
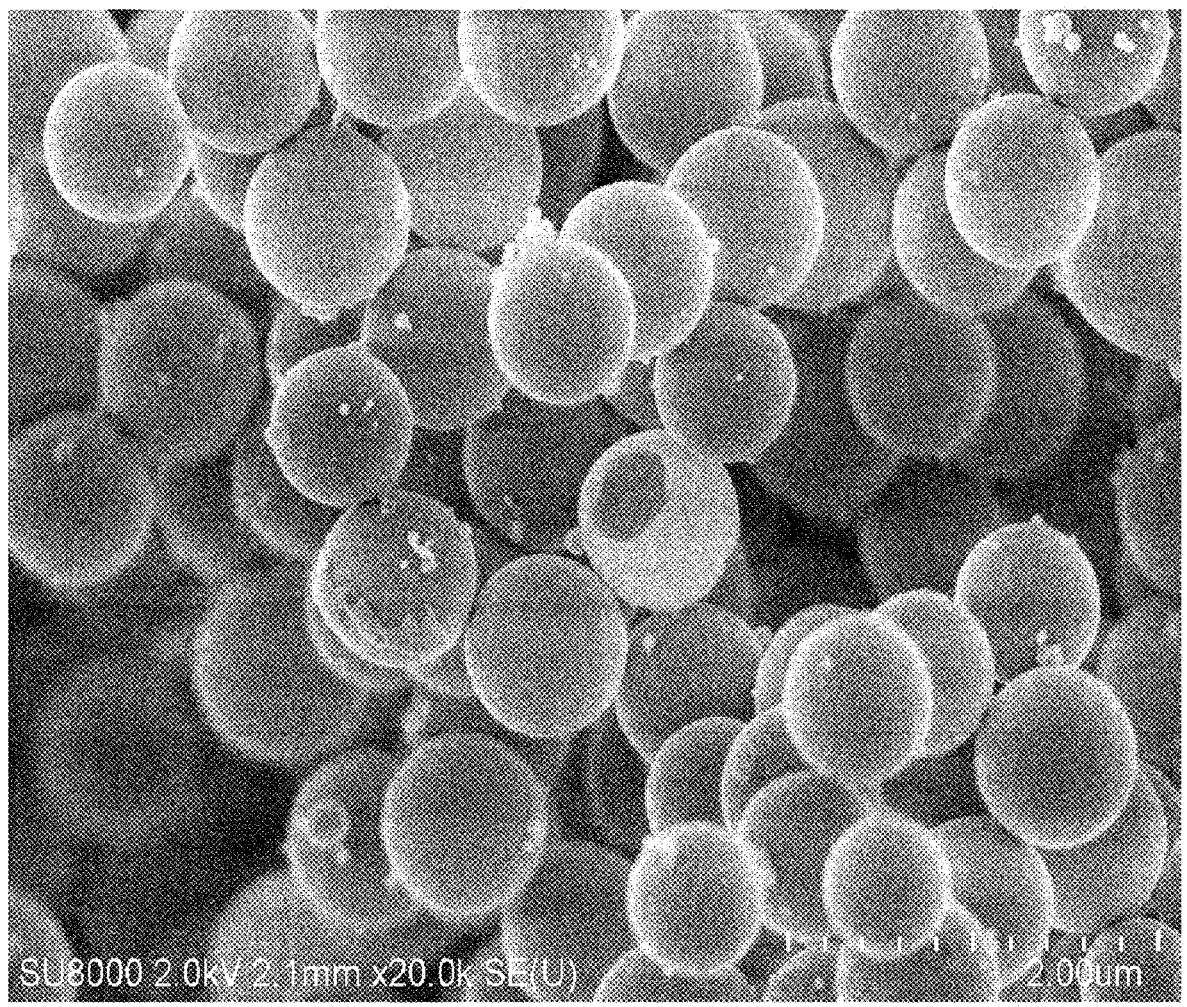
FIG. 8 is an SEM photograph of the test sample in Test Example 11 among the Examples.

In Test Example 11, the raw material silica particles were prepared by using TEOS as a raw material in the raw material silica particle preparation step, and thus D90/D10 had a small value of 1.76, whereby the particle diameters of the obtained hollow particles were obviously close to one another (FIGS. 1 and 8). Meanwhile, the hollow particles obtained in Test Examples 1 to 10 and 16 to 21 in each of which the raw material silica particles were prepared by using the metal silicon powder as a raw material in the raw material silica particle preparation step were found to have particle diameters that were not close to one another, as is known from the fact that D90/D10 in Test Example 10 was 2.78 despite being lowest (FIGS. 1 to 7 and 10 to 13). When the particle diameters are not close to one another, an advantage is obtained in that the filling ability of the hollow particles in a resin composition or a slurry composition is improved.

The hollow particles in Test Examples 4 and 18 to 21 were obtained under the same conditions, except that different types of basic substances were used. The results obviously indicate that spherical silica particles are prepared without any problem even when the basic substance is changed to any of these types of basic substances.

In all of Test Examples 3, 9, 11, 16 to 18, 22, and 23 in which dielectric loss tangents were measured, the dielectric loss tangents had very small values. In each of Test Examples 11, 17, 22, and 23 among these Test Examples, a pressurization test was performed at 300 MPa, and a true specific gravity to be measured with nitrogen gas and a dielectric loss tangent were measured before and after the pressurization test. The results provided a finding that: in Test Examples 11, 17, and 23, the true specific gravity retention rates had large values of 84% (Test Example 11), 100% (Test Example 17), and 86% (Test Example 13), respectively; and meanwhile, in Test Example 22, the true specific gravity retention rate was 0% indicating that substantially all the hollow structures were fractured. In addition, the dielectric loss tangent retention rate in Test Example 23 was found to have a very large value of 600%, and meanwhile, the dielectric loss tangent retention rates in Test Example 16 and Test Example 17 were found to have very small values of 171% and 268%, respectively. The dielectric loss tangent retention rate being high means that: impairment of a large number of voids was progressing; or a component that increased the dielectric loss tangent existed inside voids. In either of these cases, the dielectric loss tangent retention rate being high indicates that a high proportion of voids was impaired.

Figure 14:
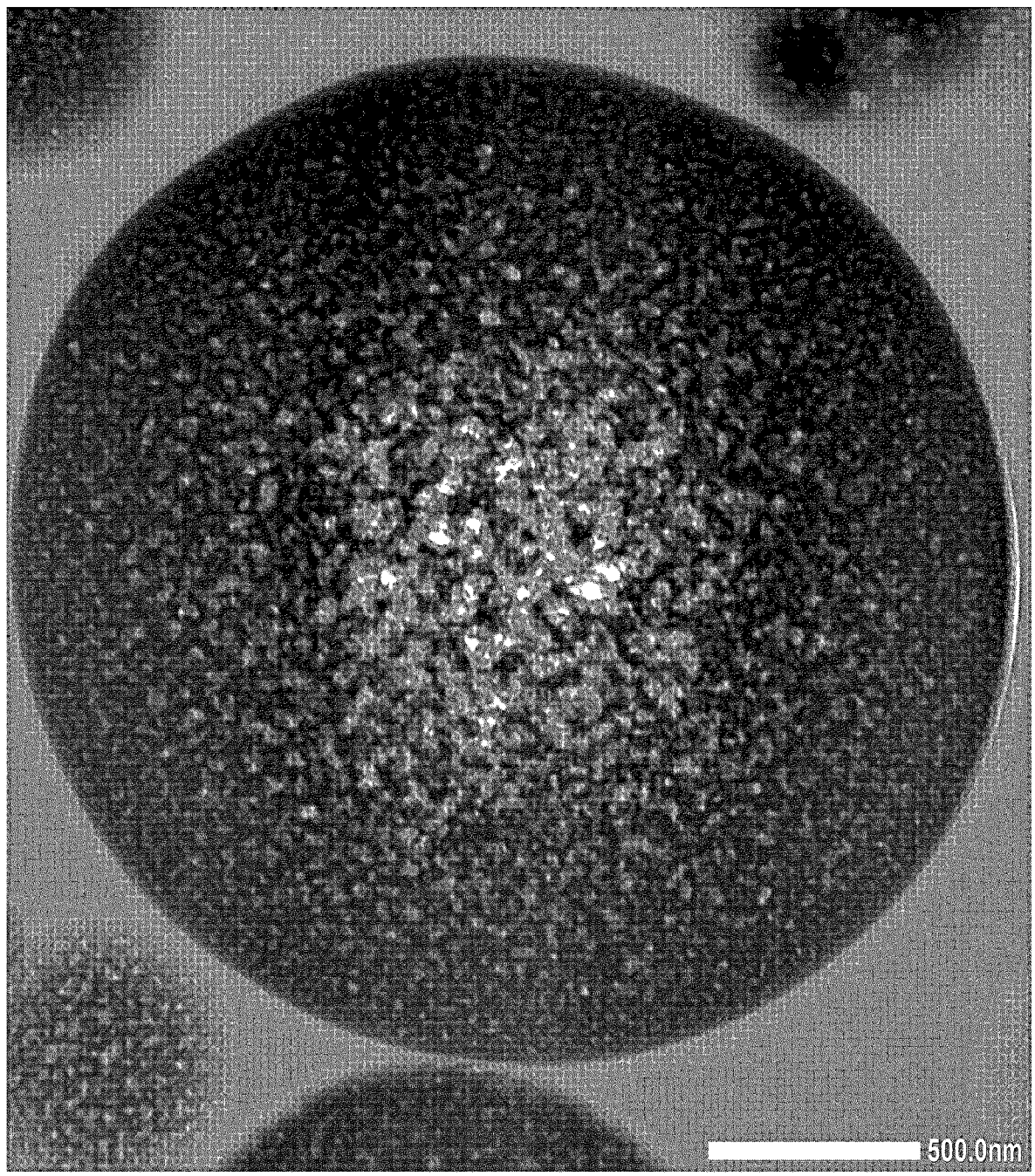
FIG. 14 is a cross-sectional TEM photograph of the test sample in Test Example 17 among the Examples.
Figure 15:
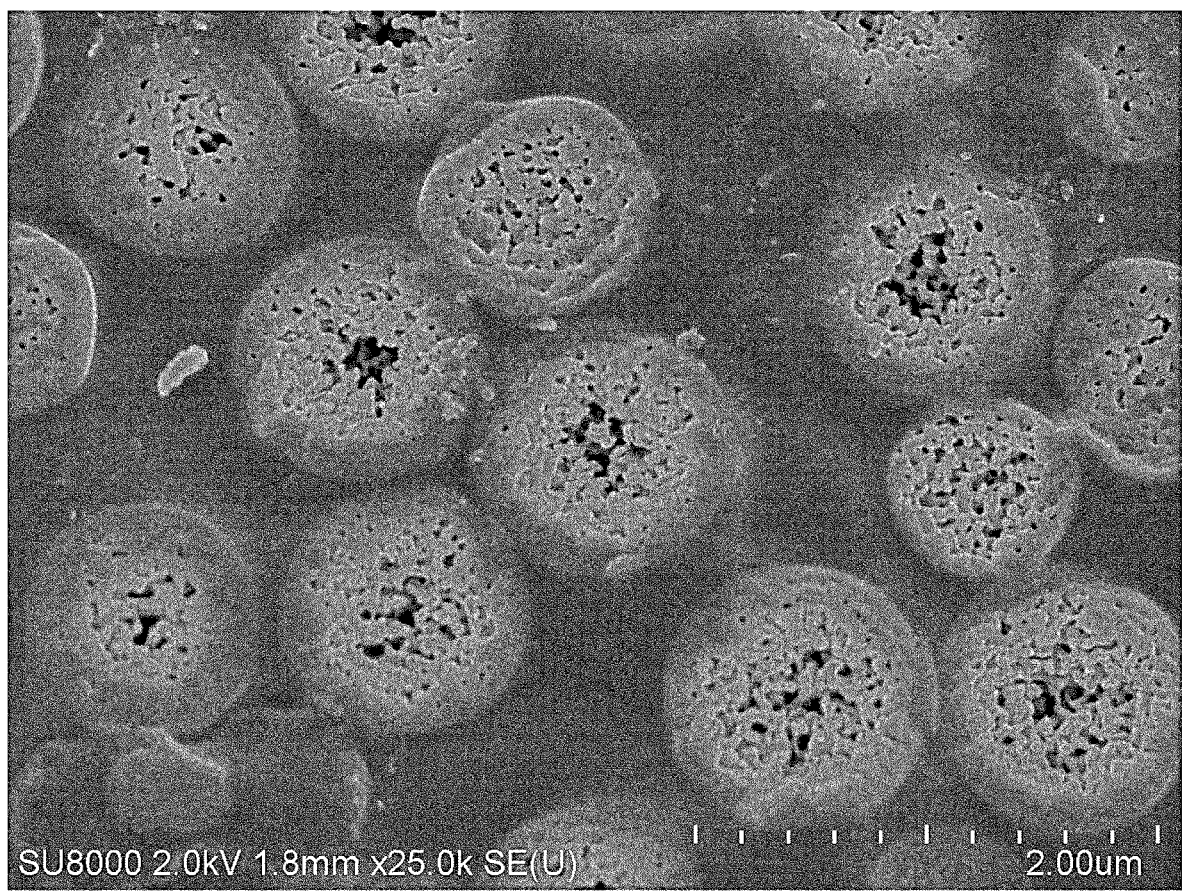
FIG. 15 is a cross-sectional SEM photograph of the test sample in Test Example 11 among the Examples.
Figure 16:
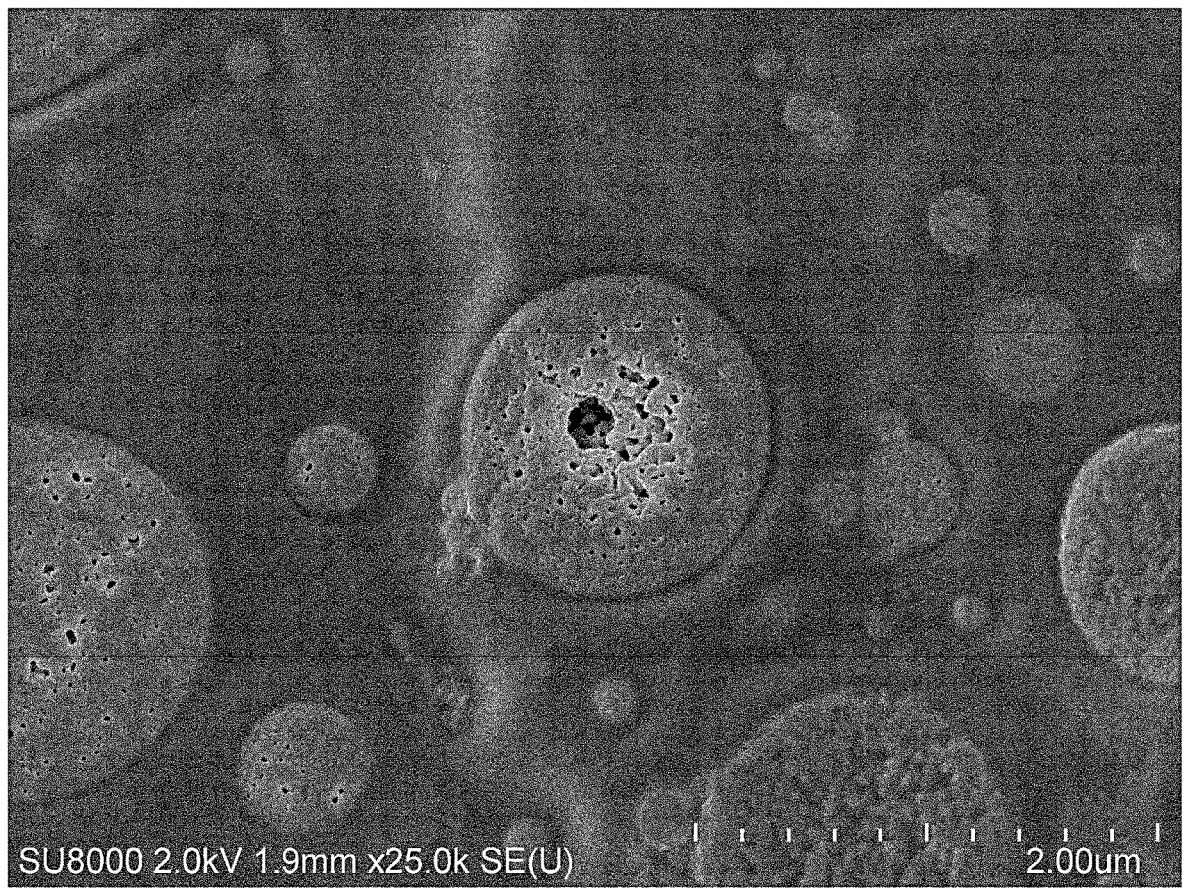
FIG. 16 is a cross-sectional SEM photograph of the test sample in Test Example 17 among the Examples.
Figure 17:
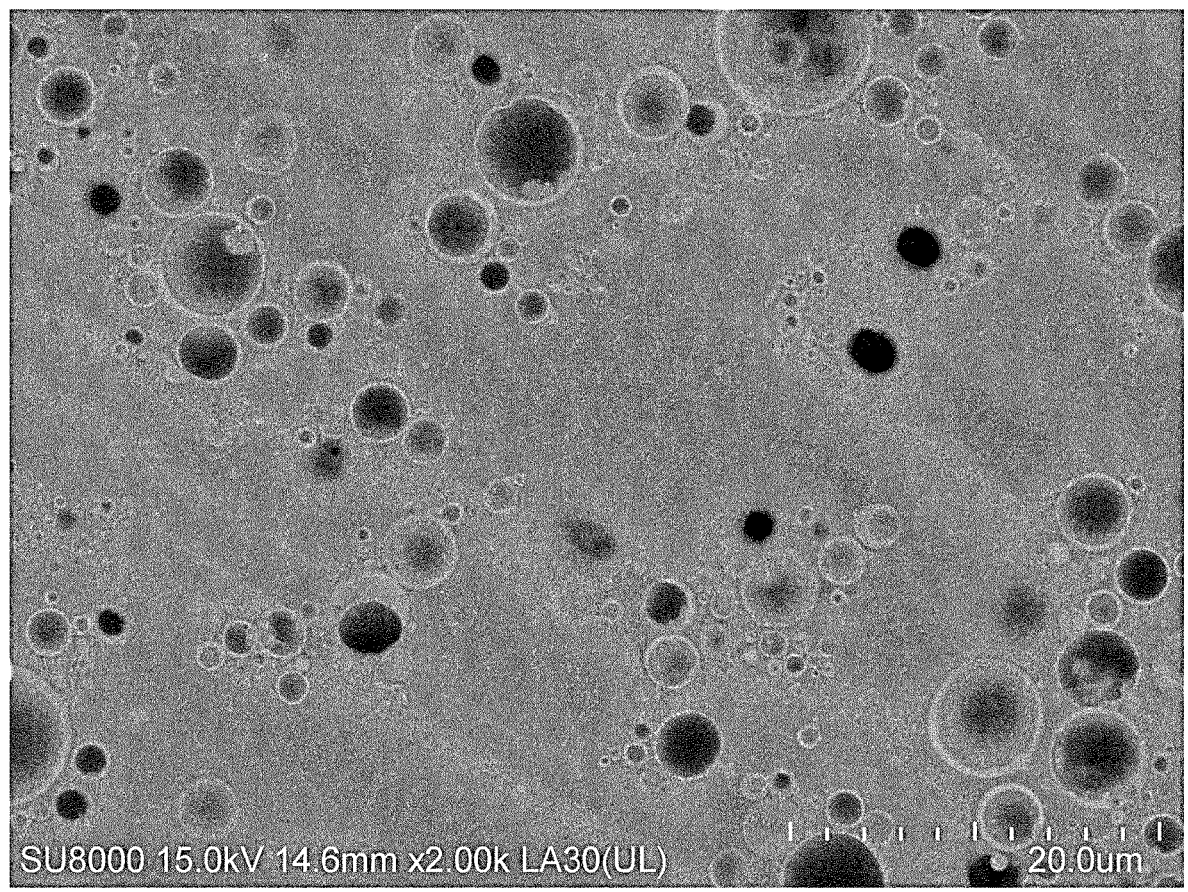
FIG. 17 is a cross-sectional SEM photograph of a test sample in Test Example 22 among the Examples.
Figure 18:
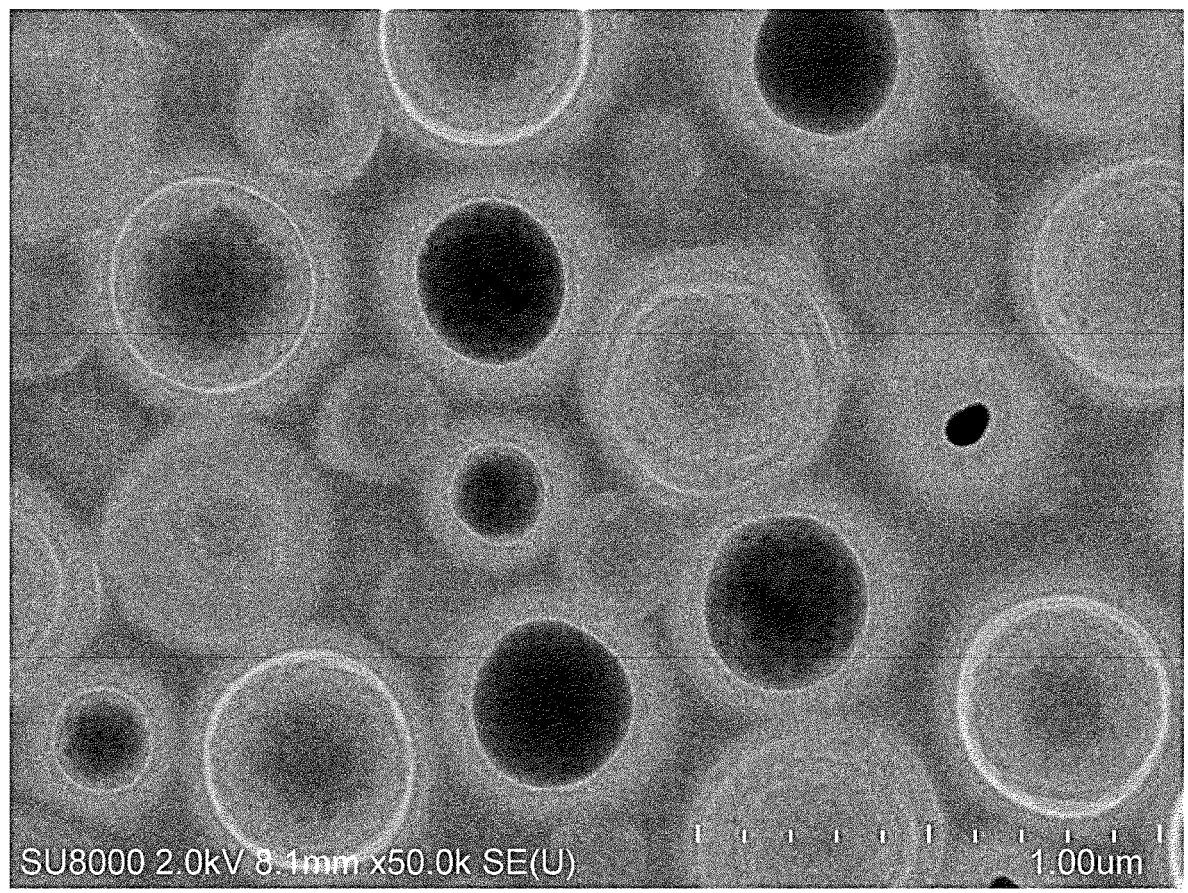
FIG. 18 is a cross-sectional SEM photograph of a test sample in Test Example 23 among the Examples.

Resistance to such impairment in these Test Examples due to the pressurization test is noticeable also from the respective cross-sectional SEM photographs and TEM photographs. Observation of the cross-sectional SEM photographs in Test Examples 11 and 17 leads to a finding that the outer shell of each of the particles was formed from a dense structure, and a plurality of fine voids were formed near the center of the particle (FIGS. 15 and 16). In addition, observation of the TEM photographs leads to a finding that, in the test sample in Test Example 17, the density near the center gradually decreased, and thus fine voids are inferred to have been formed near the center (FIG. 14). Such fine voids are hardly impaired even upon application of external force. Therefore, impairment of the internal voids are inferred to have hardly progressed even after the pressurization test. Meanwhile, in each of Test Examples 22 and 23, the internal voids were large, and thus impairment of voids due to the pressurization test are inferred to have progressed (FIGS. 17 and 18).

TABLE 2

| Article name | ICP (ppb) | | ICP | | | | | | | | |
|---|---|---|---|---|---|---|---|---|---|---|---|
| | Th | U | Na | Mg | Al | P | K | Ca | Ti | Cr | Mn |
| Test Example 24 | 29 | 19 | 1 | 1 | 400 | 11 | <1 | 46 | 7 | <1 | <1 |
| Test Example 9 | 2.3 | 0.98 | <1 | <1 | 100 | <1 | <1 | 3 | <1 | <1 | <1 |

| Article name | ICP | | | | | | | | | |
|---|---|---|---|---|---|---|---|---|---|---|
| | Fe | Co | Ni | Cu | Zn | As | Mo | Sb | B | V |
| Test Example 24 | 180 | <1 | <1 | <1 | <1 | 2 | <1 | <1 | — | — |
| Test Example 9 | 3 | <1 | <1 | <1 | 2 | <1 | <1 | <1 | 14 | <1 |

As is obvious from Table 2, the test sample in Test Example 9 produced through the method according to the present disclosure was found to have lower concentrations of impurities even though the test sample was silica particles produced from the same metal silicon powder. This is inferred to be because, in Test Example 24, the metal silicon powder was directly oxidized and turned into silica, whereas, in Test Example 9, the metal silicon powder was dissolved once and then silica was precipitated so that impurities were not taken in at the time of precipitation, whereby contents of impurities decreased.

TABLE 3

| | Test Example 11 | Test Example 17 | Test Example 22 | Test Example 23 |
|---|---|---|---|---|
| Large-internal-void particle proportion on cross section of resin composition (%) | 70 | 0 | 100 | 100 |
| Void proportion in center region A in particle internal void distribution (%) | 55 | 40 | 100 | 100 |
| Void proportion in outer shell portion region B in particle internal void distribution (%) | 8 | 5 | 85 | 55 |

As is obvious from Table 3, the test sample in Test Example 17 within the scope of the present disclosure was obviously such that: a particle having therein an internal void not smaller than half the particle diameter of the particle did not exist; and furthermore, there were two or more voids which existed unevenly in the center region.

Meanwhile, in the test samples in Test Examples 22 and 23 as commercially available products, each of all the particles had a void not smaller than half the particle diameter of the particle and had a center region, the entirety of which existed as a void. Furthermore, the void existing in the center region was found to have such a size as to extend to the outer shell portion region.

The particles in Test Example 11 prepared from TEOS were found to include many particles having comparatively large voids and have a high large-internal-void particle proportion of 70%.

The results provided a finding that the true specific gravity retention rates in Test Example 11, Test Example 22, and Test Example 23 were respectively 84%, 0%, and 86%, and meanwhile, the true specific gravity retention rate in Test Example 17 was 91% indicating that impairment of voids was suppressed. In addition, the results provided a finding that the dielectric loss tangent retention rate in Test Example 23 had a large value of 600%, and meanwhile, the dielectric loss tangent retention rate in the test sample in Test Example 17 had a small value of 268%.

Other Tests

In each of the above Test Examples, a metal silicon powder was used as a raw material for preparing an alkaline silicic acid aqueous solution. However, spherical silica particles were confirmed to be produced in the same manner also when silica particles or water glass (sodium silicate aqueous solution) was used instead of a metal silicon powder. After an alkaline silicic acid aqueous solution was prepared from each of materials which were silica and a sodium silicate aqueous solution, operations identical to the operations performed with the metal silicon powder were performed, whereby spherical silica particles equivalent to the spherical silica particles in which the metal silicon powder was used were obtained.

Method Including Using Silica Particles 20.0 g of a silica powder (product name: SO-E2 manufactured by ADMATECHS COMPANY LIMITED), 15.0 g of ion exchanged water, and 64.0 g of a 25%-by-mass TMAH aqueous solution were mixed, and the mixture was retained at 180° C. for 1 hour in a pressure container so as to dissolve the silica. Consequently, an alkaline silicic acid aqueous solution containing about 20.2% of silicic acid on a silica basis was obtained.

Method Including Using Sodium Silicate Aqueous Solution 10.2 g of a sodium silicate aqueous solution (water glass) and 15.0 g of ion exchanged water were mixed, and the mixture was stirred at 40° C. for 4 hours. Thereafter, Na ions were removed through ion exchange while 64.0 g of a 25%-by-mass TMAH aqueous solution was being dripped. As a result, an alkaline silicic acid aqueous solution containing 10.8% by mass of silicic acid on a silica basis was obtained.

The invention claimed is:

1. Spherical silica particles comprising silica as a main component, wherein
the spherical silica particles have
an average particle diameter of 0.1 to 10.0 μm,
a true specific gravity of 0.9 to 1.9 g/cm$^3$, the true specific gravity being measured with nitrogen gas,
a pore volume of 0.1 mL/g or lower,
an Na content of 10 ppm or lower, and
a true specific gravity retention rate of 80% or higher, the true specific gravity retention rate being measured with nitrogen gas and being a rate between before and after pressurization is performed at 300 MPa for 1 minute, and
the spherical silica particles include, in an existence proportion of 60% or lower, particles in each of which a maximum value among major axes of internal voids is not smaller than half a major axis of the particle.

2. The spherical silica particles according to claim 1, wherein
an average void proportion in a center region of a cross section of each of the spherical silica particles is 5% or higher and 90% or lower, and
an average void proportion in an outer shell portion region which is a region of the cross section other than the center region is not higher than the average void proportion in the center region and is 2% or higher and 80% or lower.

3. The spherical silica particles according to claim 1, wherein the spherical silica particles also have a dielectric loss tangent retention rate of 500% or lower.

4. The spherical silica particles according to claim 1, wherein the spherical silica particles also have a value of D90/D10 of 2.0 to 20.0.

5. The spherical silica particles according to claim 1, wherein the spherical silica particles also have a true specific gravity of 2.2 g/cm$^3$ or higher, the true specific gravity being measured with helium gas.

6. The spherical silica particles according to claim 1, each comprising a surface in which an organic functional group has been introduced.

7. A slurry composition comprising:
the spherical silica particles according to claim 1; and
a dispersion medium in which the spherical silica particles are dispersed.

8. A resin composition comprising:
the spherical silica particles according to claim 1; and
a resin material in which the spherical silica particles are dispersed.

9. A method for producing the spherical silica particles of claim 1, the method comprising:
a raw material silica particle preparation step of preparing a liquid dispersion of raw material silica particles from a raw material solution obtained by dissolving silicic acid in a mixed solvent of water and an organic solvent in the presence of a basic substance formed from at least one of a quaternary ammonium and a base having a cyclic amidine structure;
a hydrothermal treatment step of substituting, with water, a dispersion medium which is contained in the liquid dispersion and in which the raw material silica particles are dispersed, and then performing pressurization and heating to 130° C. or higher and 250° C. or lower, thereby obtaining a hydrothermally treated liquid dispersion of the raw material silica particles; and
a heating step of heating the liquid dispersion or heating the raw material silica particles obtained from the liquid dispersion through solid-liquid separation so as to remove an organic substance contained in the liquid dispersion, thereby preparing the spherical silica particles, the heating step being subsequent to the hydrothermal treatment step, wherein
the mixed solvent has a relative permittivity of 21 or higher and 40 or lower, and
the quaternary ammonium derived from the basic substance is blended in a blending ratio of 0.3 or higher and 0.8 or lower in terms of molar ratio with respect to a silicon element derived from the silicic acid.

10. The method according to claim 9, wherein the organic solvent is at least one type of solvent selected from the group consisting of acetone, methyl ethyl ketone, and ethyl acetate.

11. The method according to claim 9, wherein the basic substance is at least one type of compound selected from the group consisting of quaternary ammoniums each having 4 to 16 carbon atoms, diazabicycloundecene, and diazabicyclononene.

12. The method according to claim 9, wherein the heating step includes performing the heating at 900° C. or higher.

\* \* \* \* \*